United States Patent [19]
Lewis et al.

[11] Patent Number: 5,837,960
[45] Date of Patent: *Nov. 17, 1998

[54] LASER PRODUCTION OF ARTICLES FROM POWDERS

[75] Inventors: Gary K. Lewis, Los Alamos; John O. Milewski, Santa Fe; David A. Cremers, Los Alamos; Ronald B. Nemec; Michael R. Barbe, both of White Rock, all of N. Mex.

[73] Assignee: The Regents of the University of California, Oakland, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 566,430

[22] Filed: Nov. 30, 1995

Related U.S. Application Data

[60] Provisional application No. 60/002,261, Aug. 14, 1995.

[51] Int. Cl.$^6$ .................................................. B23K 26/00
[52] U.S. Cl. ............................... 219/121.63; 219/121.64; 219/121.65; 219/121.66; 219/121.85; 364/468.26
[58] Field of Search ........................ 219/121.63, 121.64, 219/121.65, 121.66, 121.84, 121.85; 427/554, 555, 556, 596, 597; 364/468.26, 474.08; 264/497; 118/620; 156/272.8; 419/61; 75/10.13

[56] References Cited

U.S. PATENT DOCUMENTS

| | | | |
|---|---|---|---|
| 4,323,756 | 4/1982 | Brown et al. . | |
| 4,603,257 | 7/1986 | Packer et al. | 250/358.1 |
| 4,665,492 | 5/1987 | Masters | 364/468.26 |
| 4,724,299 | 2/1988 | Hammeke . | |
| 4,743,733 | 5/1988 | Mehta . | |
| 4,863,538 | 9/1989 | Deckard | 156/62.2 |
| 4,927,992 | 5/1990 | Whitlow et al. | 219/121.65 |
| 4,938,816 | 7/1990 | Beaman et al. | 156/62.2 |
| 4,944,817 | 7/1990 | Bourell et al. | 156/62.2 |
| 5,017,753 | 5/1991 | Deckard et al. | 219/121.63 |
| 5,038,014 | 8/1991 | Pratt et al. | 219/121.64 |
| 5,043,548 | 8/1991 | Whitney et al. | 219/121.47 |
| 5,111,021 | 5/1992 | Jolys et al. | 219/121.6 |
| 5,132,143 | 7/1992 | Deckard et al. | 427/197 |
| 5,135,695 | 8/1992 | Marcus | 264/141 |

(List continued on next page.)

FOREIGN PATENT DOCUMENTS

| | | |
|---|---|---|
| 0370967 | 5/1990 | European Pat. Off. . |
| 0490146 | 12/1990 | European Pat. Off. . |
| 1-87713 | 3/1989 | Japan . |
| 4-84684 | 3/1992 | Japan ................................ 219/121.63 |
| 2227964 | 8/1990 | United Kingdom . |

OTHER PUBLICATIONS

Frenk et al., "Laser Cladding with Cobalt–Based Hardfacing Alloys," Journal De Physique V, vol. 1, pp. C7–65 through C7–68, Dec. 1991.

Jasim, et al., "Thermal Barrier Coatings Produced by Laser Cladding," Journal of Materials Science, vol. 25, pp. 4943–4948, 1990.

Subramanian et al., "Laser Cladding of Zirconium on Magnesium for Improved Corrosion Properties," Journal of Materials Science, vol. 26, pp. 951–956, 1991.

(List continued on next page.)

*Primary Examiner*—Gregory L. Mills
*Attorney, Agent, or Firm*—Gemma Morrison Bennett

[57] ABSTRACT

Method and apparatus for forming articles from materials in particulate form in which the materials are melted by a laser beam and deposited at points along a tool path to form an article of the desired shape and dimensions. Preferably the tool path and other parameters of the deposition process are established using computer-aided design and manufacturing techniques. A controller comprised of a digital computer directs movement of a deposition zone along the tool path and provides control signals to adjust apparatus functions, such as the speed at which a deposition head which delivers the laser beam and powder to the deposition zone moves along the tool path.

30 Claims, 20 Drawing Sheets

U.S. PATENT DOCUMENTS

| | | | |
|---|---|---|---|
| 5,155,324 | 10/1992 | Deckard et al. | 219/121.64 |
| 5,160,822 | 11/1992 | Aleshin | 219/121.64 |
| 5,182,430 | 1/1993 | Lagain | 219/121.63 |
| 5,208,431 | 5/1993 | Uchiyama et al. | 219/121.65 |
| 5,245,155 | 9/1993 | Pratt et al. | 219/121.63 |
| 5,252,264 | 10/1993 | Forderhase et al. . | |
| 5,398,193 | 3/1995 | deAngelis | 364/468.26 |
| 5,418,350 | 5/1995 | Freneaux et al. | 219/121.84 |
| 5,477,026 | 12/1995 | Buongiorno | 219/121.84 |
| 5,512,162 | 4/1996 | Sachs et al. | 156/272.8 X |
| 5,530,221 | 6/1996 | Benda et al. | 219/121.83 |
| 5,578,227 | 11/1996 | Rabinovich | 219/121.63 |
| 5,607,730 | 3/1997 | Ranalli | 427/512 |
| 5,647,931 | 7/1997 | Retallick et al. | 156/73.6 |

OTHER PUBLICATIONS

Damborenea et al., "Laser Cladding of High–Temperature Coatings," Journal of Materials Science, vol. 28, pp. 4775–4780, 1993.

Mazumder et al., "Solid Solubility in Laser Cladding," Journal of Metals, pp. 18–23, Feb. 1987.

Kizaki et al., "Phenomenological Studies in Laser Cladding," Parts I and II, Japanese Journal of Applied Physics, vol. 32, Part 1, No. 1A, pp. 205–220, Jan. 1993.

Xin et al., "Maximum Thickness of the Laser Cladding," Key Engineering Materials, vol. 46 & 47, pp. 381–386, 1990.

Schanwald, "Two Powder Stream Diagnostics for Laser Deposition Processes," ICALEO '95, 1995.

Schanwald, "Two Thermal Monitors for High Power Laser Processing," ICALEO '95, 1995.

"From Computer to Component in 15 Minutes: The Integrated Manufacture of Three–Dimensional Objects", Harris L. Marcus et al., *Journal of Metals*, Apr. 1990.

"Solid Freeform Fabrication: Powder Processing" by Harris L. Marcus et al., *Ceramic Bulletin*, vol. 69, No. 6, 1990.

R and D Magazine Award Announcement, Sep. 1994 (2 pages).

Dateline Los Alamos, Sep. 1994 (2 pages). Distributed by Los Alamos National Laboratory.

Synopsis "Directed Light Fabrication" and Transmittal Letter (3 pages). Undated, handed out after publications of the documents. Referenced in Transmittal Letter.

R and D 100 Announcement, Sep. 1994, Los Alamos National Laboratory.

Abstract "Directed Light Fabrication". For ICALEO '94, 13th International Congress on Applications of Laser and Electro–Optics, Oct. 17–20, 1994.

ICALEO '94—Proceedings of the 13th International Congress on Applications of Lasers and Electro–Optics, Oct. 17–20, 1994.

"Direct Laser Metal Deposition Process Fabricates Near–Net–Shape Components Rapidly" by Gary K. Lewis, *Materials Technology*, vol. 10, Nos. 3/4, Mar./Apr. 1995.

"Direct Production of Metallic Parts by Rapid Prototyping" by J. P. Kruth et al. Proceedings of the 12th International Congress (LASER '95).

Video tape "Directed Light Fabrication of Complex Metal Parts (DLF)", Dec. 1, 1994, Los Alamos Nat'l Lab.

Video tape "Directed Light Fabrication R&D 100 Awards", Jan. 6, 1995, Los Alamos Nat'l Lab.

Keicher, D.M. and John E. Smugeresky, "Overview: The Laser Forming of Metallic Components Using Particulate Materials," *JOM*, vol. 49, No. 5, May 1997.

Mazumder, J., J. Choi, K. Nagarathnam, J. Koch, and D. Hetzner, "Research Summary: The Direct Metal Deposition of H13 Tool Steel for 3–D Components," *JOM*, vol. 49, No. 5, May 1997.

Lewis, Gary K. (editor), "Directed Light Fabrication," Los Alamos National Laboratory, Jun. 1996.

5,837,960

LASER PRODUCTION OF ARTICLES FROM POWDERS

This invention was made with government support under Contract No. W-7405-ENG-36 awarded by the U.S. Department of Energy. The government has certain rights in the invention.

This application claims the benefit of the priority date of provisional application Ser. No. 60/002,261 filed Aug. 14, 1995 having the same title and inventorship.

FIELD OF THE INVENTION

This invention relates to the field of fabrication of articles and, more particularly, to production of objects using particulate matter, or powder, as a starting material.

BACKGROUND OF THE INVENTION

This invention may be termed directed light fabrication (DLF) or the DLF process.

The present invention may be used to produce articles of any material which is obtainable in the form of a powder, but its primary use is expected to be production of metal articles.

Metal objects are currently produced by thermomechanical processes which include casting, rolling, stamping, forging, extrusion, machining, and joining operations. Multiple steps are required to produce a finished article. These conventional operations often require the use of heavy equipment and molds, tools, and dies. For example, a typical process sequence required to form a small cylindrical pressure vessel might include casting an ingot, heat treating and working the casting to homogenize it by forging or extrusion or both, then machining a hollow cylinder and, separately, end caps from the worked ingot and, finally, welding the end caps to the cylinder. This invention provides a method for forming such an article in a single operation and using less equipment. An article formed by laser deposition is relatively free of internal stresses in comparison to an article formed by welding one or more components together. Also, joining components by means of welding requires equipment just for the single step of joining and time to set up the equipment to do the job.

Conventional production methods are subtractive in nature in that material is cut away from a starting block of material to produce a more complex shape. Subtractive machining methods are deficient in many respects. Large portions of the starting material are reduced to waste in the form of cuttings. These methods produce waste materials, such as metal cuttings, oils, and solvents, which must be further processed for purposes of reuse or disposal. The articles produced are contaminated with cutting fluids and metal chips. They require cutting tools which wear and must be periodically reconditioned and ultimately replaced. Fixtures for use in manufacturing must be designed, fabricated, and manipulated during production. When a part is unusual in shape or has internal features, machining is more difficult. Choosing the machining operations to be used and the sequence of operations requires a high degree of experience. A number of different machines are needed to provide capability to perform the variety of operations which are often required to produce a single article. Sophisticated machine tools require a significant capital investment and occupy a good deal of space. Use of the invention in place of subtractive machining provides solutions to these problems and disadvantages. The inventive process may be characterized as additive in nature. The raw material which does not become part of an article is easily collected and re-used without processing. There is no need to dispose of waste liquids and metal cuttings and the articles produced are not contaminated by these materials. Fixtures and cutting tools are not required. All work needed to produce an article is accomplished using a computer workstation and a single production station. Also, this invention can be used to rapidly provide production tooling after article design is frozen.

Another difficulty with conventional machining techniques is that many objects must be produced by machining a number of parts and then joining them together. Producing parts separately and joining them requires closetolerance machining of matching parts, provision of fastening means, such as threaded connections, and welding together of components. These operations involve a significant portion of the cost of producing an article, as they require time for design and production as well as apparatus for performing them.

The process of designing an article for volume production often consumes a good deal of time. Much of this time is spent in producing prototypes. Prototyping may require specialized apparatus and services which are not available in-house. Molds, tools, and dies are particularly difficult to obtain rapidly. Once a prototype is made, it is often necessary to make changes in the design and make another prototype. The present invention provides a method for rapid prototyping. As commonly used today, rapid prototyping refers simply to making a pattern or nonfunctional part. A non-functional article allows fit and form to be tested. It is considerably more difficult and time-consuming to make a prototype to test function, that is, which has the mechanical properties needed to test the article in its intended use. This invention is capable of producing a true rapid prototype, which can be used in a service test to investigate stresses, strains, fracture properties, and wear properties. After testing, the design of the article may be changed and another true prototype made and tested. This rapid reiteration provides an ability to optimize a design in a short period of time.

An article made by the DLF process has annealed properties, that is, its microstructure and metallurgical properties are similar to articles which have been annealed. If the material of a DLF article is heat-treatable, the properties of the article, such as strength, ductility, fracture toughness, and corrosion resistance, can be modified by means of heat treatment. An article formed by a conventional cold working process of a material having a large strain-hardening coefficient (such as austenitic stainless steel) will have relatively high strength compared to a DLF-formed article. Examples of cold working processes are forging and extrusion. If, however, a cold-formed article is subjected to the heat of welding, its strength will be reduced to that of annealed articles. Thus, DLF is an attractive alternative to fabrication by subtractive machining and welding, but cannot be substituted for processes in which a near net shape article is fabricated by cold-forming without welding and the high strength of cold-forming is required.

Following are descriptions of background patents.

U.S. Pat. No. 4,724,299 teaches a nozzle for cladding of an object using metal powder melted by a laser beam.

U.S. Pat. No. 5,111,021 deals with adding material to a surface using a laser beam and metal powder and discloses a nozzle for doing so.

U.S. Pat. No. 4,863,538 teaches a method of producing a part by sintering numerous layers of powder which are individually distributed over a surface. A laser beam is rastered over a layer of powder to provide the heat required for sintering to take place. U.S. Pat. No. 5,017,753 teaches a method of distributing a layer of powder for use with this patent.

U.S. Pat. No. 4,743,733 teaches repair of an article by directing a laser beam and a stream of metal powder to a region of the article which requires repair.

U.S. Pat. No. 4,323,756 teaches a method for producing metallic articles from metal powders and substrates which become part of the articles. A focused energy beam is used to create a molten pool on a substrate and metal powder is supplied to a point outside of the area at which the beam impinges upon the substrate. Movement of the substrate then carries the powder into the beam and molten pool, where it melts and mixes with the melted substrate material. It is stated in the patent that multiple melting is essential to use of powder as a feed material. Multiple melting refers to the fact that each portion of material applied to the substrate is melted more than once because the molten pool created by the beam has a greater depth than the thickness of a single layer of applied material. Also, it is stated that a critical feature of the invention is the location of the material feed point outside of the point of intersection of the energy beam with the workpiece.

SUMMARY OF THE INVENTION

This invention is method and apparatus for forming articles from materials in particulate form in which the materials are melted by a laser beam and deposited at points along a tool path to form an article of the desired shape and dimensions. Preferably, the tool path and other parameters of the deposition process are established using computer-aided design and manufacturing techniques. A controller comprised of a digital computer directs movement of a deposition zone along the tool path and provides control signals to adjust apparatus functions, such as the speed at which a deposition head which delivers the laser beam and powder to the deposition zone moves along the tool path.

It is an object of this invention to provide method and apparatus for producing articles without use of molds, patterns, forming dies, or cutting tools.

Another object of the invention is to produce one-piece objects having intricate shapes, eliminating the necessity of machining several parts and then joining them to yield the desired object.

Another object is to reduce or eliminate use of multiple steps and machines, each of which must be set up to perform a single operation to which the machine is specially adapted.

Another object is to provide method and apparatus to produce articles more rapidly than by conventional methods.

A further object of the invention is to reduce the waste of starting materials which is inherent in subtractive machining processes.

A still further object is to reduce generation of waste materials which must be processed for re-use or disposal.

Another object is to provide a method for accomplishing true rapid prototyping by producing a functioning prototype.

Another object is to enable rapid and low-cost production of one-of-a-kind or small numbers of articles.

Another object is to eliminate the need for human judgment and expertise in choosing a machining protocol, that is, the particular operations which need to be performed in order to produce a finished article.

Another object is to provide a method for producing a large variety of articles using a single manufacturing station.

Another object is to provide a method of producing articles having desirable mechanical properties, such as homogenous microstructure and high density.

Still another object of the invention is to produce articles free of contamination resulting from contact with machining tools, cutting fluids, and the typical machine shop or factory environment.

Another object is to provide method and apparatus for fabricating a variety of articles in a comparatively small workspace.

Another object is to provide a method for fabrication of tools, dies, and other fixtures for use in conventional high-volume production of articles.

Another object is to produce near net shape articles without use of substractive machining methods.

Another object is to provide the capability of accomplishing rapid solidification processing.

Another object is to produce articles of functionally graded composition.

Another object is to produce single articles of dissimilar metals.

Another object is to produce articles having variable density.

In one embodiment, the invention is a method of forming an article from materials in particulate form, said method comprising defining shape and dimensions of an article and creating a tool path and control commands effective to form said article by deposition of molten material; focusing a laser beam at a location within a deposition zone; providing powder to said deposition zone along a plurality of paths which are disposed about the laser beam and converge within the deposition zone; forming a pool of molten material in the deposition zone by melting a portion of an article support and said powder by means of energy provided by said laser beam; depositing molten material from the deposition zone on said article support at points along a first portion of said tool path by moving the deposition zone along the tool path, where said molten material solidifies after leaving the deposition zone, in order to form a portion of said article which is adjacent to the article support; forming a pool of molten material in the deposition zone by melting a portion of said partially formed article and said powder by means of energy provided by the laser beam; depositing molten material from the deposition zone at points along a second portion of the tool path by moving the deposition zone along the tool path, where the molten material solidifies after leaving the deposition zone, in order to complete formation of the article; and controlling flow of powder into the deposition zone, energy density of the laser beam, and speed of movement of the deposition zone along the tool path by means of said control commands as deposition takes place.

In another embodiment, the invention is apparatus for forming an article from materials in particulate form comprising means for defining shape and dimensions of an article and creating a tool path and control commands which are effective to form said article by deposition of molten material; means for storing said tool path and control commands; means for providing a laser beam and focusing said laser beam at a location within a deposition zone, where said laser beam is capable of providing sufficient energy to substantially melt material in said deposition zone; a delivery nozzle comprised of a laser beam passage through which the laser beam passes and a plurality of passages for flow of powder carried by a gas stream, where said powder passages are disposed around said beam passage and their extended axial center-lines converge in the deposition zone; means for providing powder to said delivery nozzle; means for moving the deposition zone along said tool path means for controlling movement of the deposition zone in accordance with said stored tool path; and means for controlling rate of flow of powder into the deposition zone, energy density of the laser beam, and speed of movement of the deposition zone along the tool path in accordance with said stored control commands.

DETAILED DESCRIPTION OF THE INVENTION

Figure 1:
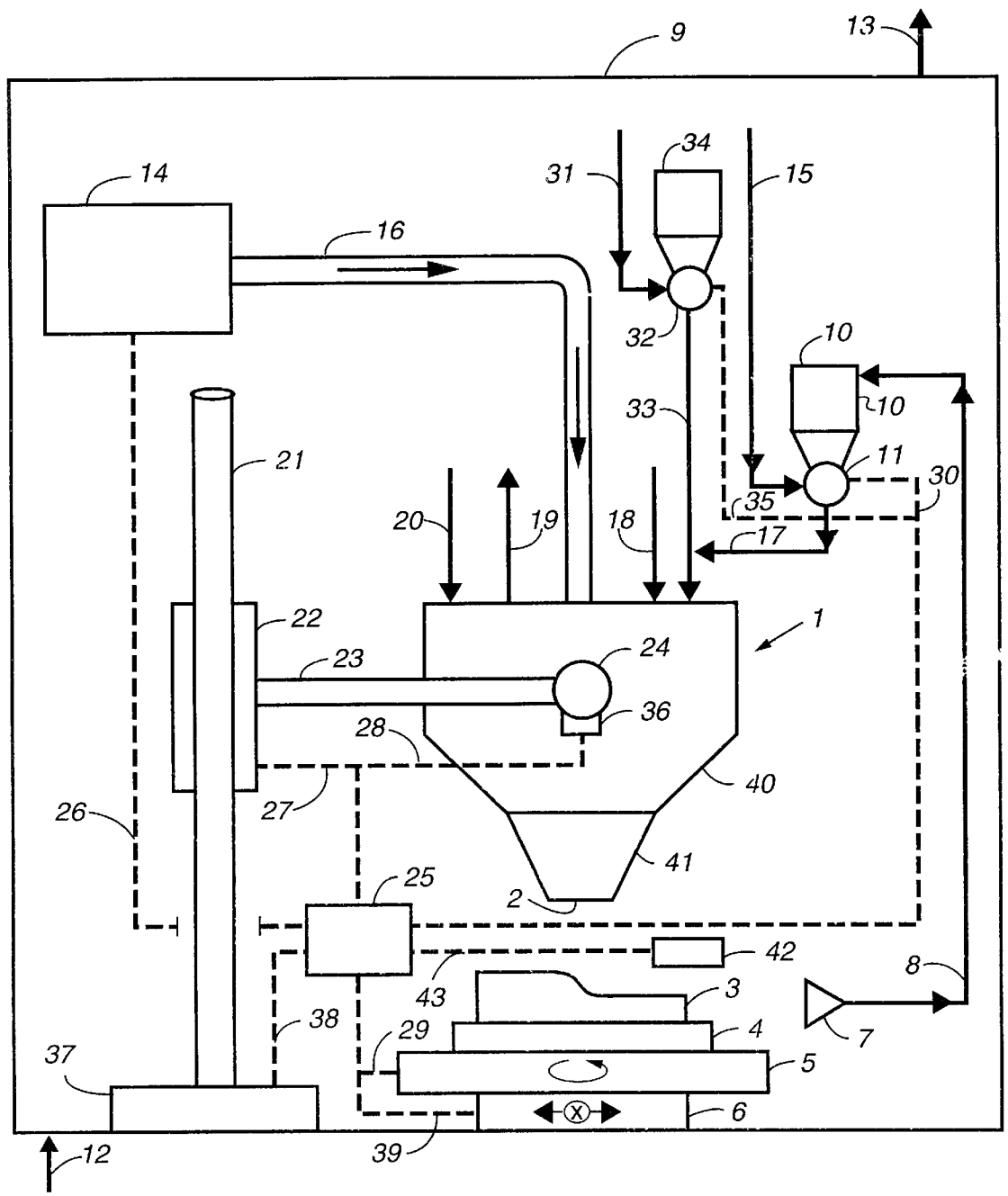
FIG. 1 is a schematic and functional representation of apparatus for producing an article of this invention.

An article is constructed by depositing molten material along a tool path which has been designed to yield the desired article shape and dimensions, where this molten material is formed from a powder, or solid particulate matter, which is supplied to points along the tool path and melted at those points. The term "tool path" is used herein because it is familiar to those skilled in the art of machining with CNC apparatus and similar apparatus is used in practice of the invention. To start fabrication of an article, laser light is focused at a point on an article support and a stream of particulate matter, or powder, is supplied to that point. A small portion of the article support is melted by the laser beam to form a molten pool. The powder is melted by heat generated when the laser light strikes the particles and by transfer of heat from the molten pool to the powder as powder impinges on the molten pool. After a small amount of material has been deposited, the molten pool is formed, in part, by re-melting the deposited material. The space containing and surrounding the molten pool, the laser spot, the "focal point" of the powder stream, the focal point of the laser beam, and that portion of the laser beam where energy density is great enough to melt material is termed the deposition zone.

The deposition zone is moved along the tool path, leaving behind deposits consisting of the powder which has been consolidated by melting and, then, solidification due to loss of heat to the surroundings. A first portion of the tool path is designed to provide a base portion of the article. The base portion consists of deposited material which is in contact with the article support. After deposition along the relatively small first portion of the tool path is complete, deposition is continued along a second portion of the tool path to complete production of the article. During this second step, the molten pool formed in the deposition zone consists of previous deposits and the powder supplied to the deposition zone. It is desirable that the molten pool be small, in order to minimize the energy requirement, facilitate control of the molten pool, and permit production of an article with tight dimensional tolerances. After deposition is complete, the article may be separated from the article support, since the support is not normally intended to be a part of the article produced by the inventive process. However, applications can be envisioned in which an article is designed to utilize the article support as part of the article.

Relative motion between the deposition zone and the article support or the portion of the article already formed is accomplished with apparatus similar to that used in CNC (computer numerically controlled) machining, where motion of a cutting tool is directed by a controller comprised of a digital computer which contains machine operating code, or an operation program, or a machine operating file. The tool path is usually designed, or constructed, by use of a digital computer and a number of computer programs. In one embodiment of the invention, an article can be considered to be a plurality of thin layers of deposited material. For example, in fabrication of a tube, or thin-walled hollow cylinder, the tool path can be viewed as a large number of circles. In one pass of a deposition zone, or one movement of the zone of 360 degrees around the perimeter of the tube, a tube with an outside diameter of 0.85 inch and a wall thickness of 0.075 inch was increased in height, or length, by 0.004 inch. The layer of material deposited in the pass was shaped as a ring having an outside diameter of 0.85 inch, an inside diameter of 0.775 inch, and a thickness, or height, of 0.004 inch. If it had been desired to fabricate a tube with a thicker wall, a second 360 degree deposition pass could have been done in the same horizontal plane to produce a wider ring.

The shape and dimensions of an article are determined by, in addition to the tool path, control commands which are established in conjunction with the design of the tool path. A controller adjusts speed of movement of the deposition zone, energy density of the laser beam, and rate of flow of powder into the deposition zone in accordance with these commands.

The invention may be broadly viewed as reverse machining, that is, instead of starting out with a billet of material and removing material, laser deposition is an additive process. One can envision running a movie of a conventional machining operation in reverse, so that the cutting tool appears to be adding material. However, a tool path used in laser deposition is not the same as a conventional machining tool path. A machining tool path consists of locations where material is not present in the finished article, whereas a DLF tool path consists of locations where solid material exists in the finished article.

FIG. 1 depicts, in a functional manner, apparatus which may be used to practice the invention. Referring to FIG. 1, article 3 is in the process of formation and rests upon support 4, which in turn rests upon rotary table 5. The rotary table rests on X-Y table 6. Table 6 may be viewed as movable both in a side-to-side direction and in a direction normal to the plane of the drawing. Article 3 (and substrate 4) may be rotated about a vertical axis of the article by means of rotary table 5. Deposition head 1 is mounted on arm 23 and is capable of rotation about a horizontal shaft depicted by reference number 24. The deposition head is comprised of delivery nozzle 41 and optics package 40. Arm 23 is attached to positioner 22, which is capable of movement up and down along post 21. Post 21 is capable of rotation about its vertical axis. (This rotation feature is not incorporated in the apparatus whose use is described herein.) Powder and a laser beam exit delivery nozzle 41 at its lower end at a location shown by reference number 2. Laser light is produced in laser generator 14 and provided to deposition head 1 by means of flexible fiber optic 16. Optics package 40, which is commercially available, focuses a laser beam (not shown) at a point within a deposition zone (not shown) located at article 3. Powder is provided to the deposition head from powder containers 10 and 34 by means of powder feeders 11 and 32 through conduits 17 and 33. The powder feeders are capable of providing a variable flow of powder. Carrier gas for delivery of powder is supplied to powder feeders 11 and 32 through conduits 15 and 31. Cooling water is provided to the delivery nozzle through conduit 20 and removed from the nozzle by means of conduit 19. An inert gas for use in protection of the windows through which the laser beam passes is supplied by conduit 18. The apparatus is enclosed within enclosure 9 and conduits 12 and 13 are provided to flow inert gas into the enclosure and to evacuate the enclosure. Powder pickup 7 collects powder which is discharged from delivery nozzle 1 but not melted. This powder is returned to powder container 10 for reuse by means of conduit 8.

Controller 25 provides control signals for operating the apparatus to produce an article. Control leads 29 and 39 depict the signals required to cause movement of the X-Y table and the rotary table. Control lead 38 provides a signal to actuator base 37 for control of rotation of post 21. The control signal for movement of delivery nozzle 1 in a vertical direction is provided to positioner 22 by control lead 27. Control lead 28 provides a signal to actuator 36, which causes the delivery nozzle to rotate about shaft 24. Commands to vary the power level of the laser beam and to turn the beam on and off are provided to laser generator 14 by control lead 26. Flow rate of powder is adjusted by controller 25 by means of control leads 30 and 35. Sensors, depicted by reference number 42, provide information on deposition head and article configuration to controller 25 by means of control lead 43. These sensors will be further described below.

Figure 2:
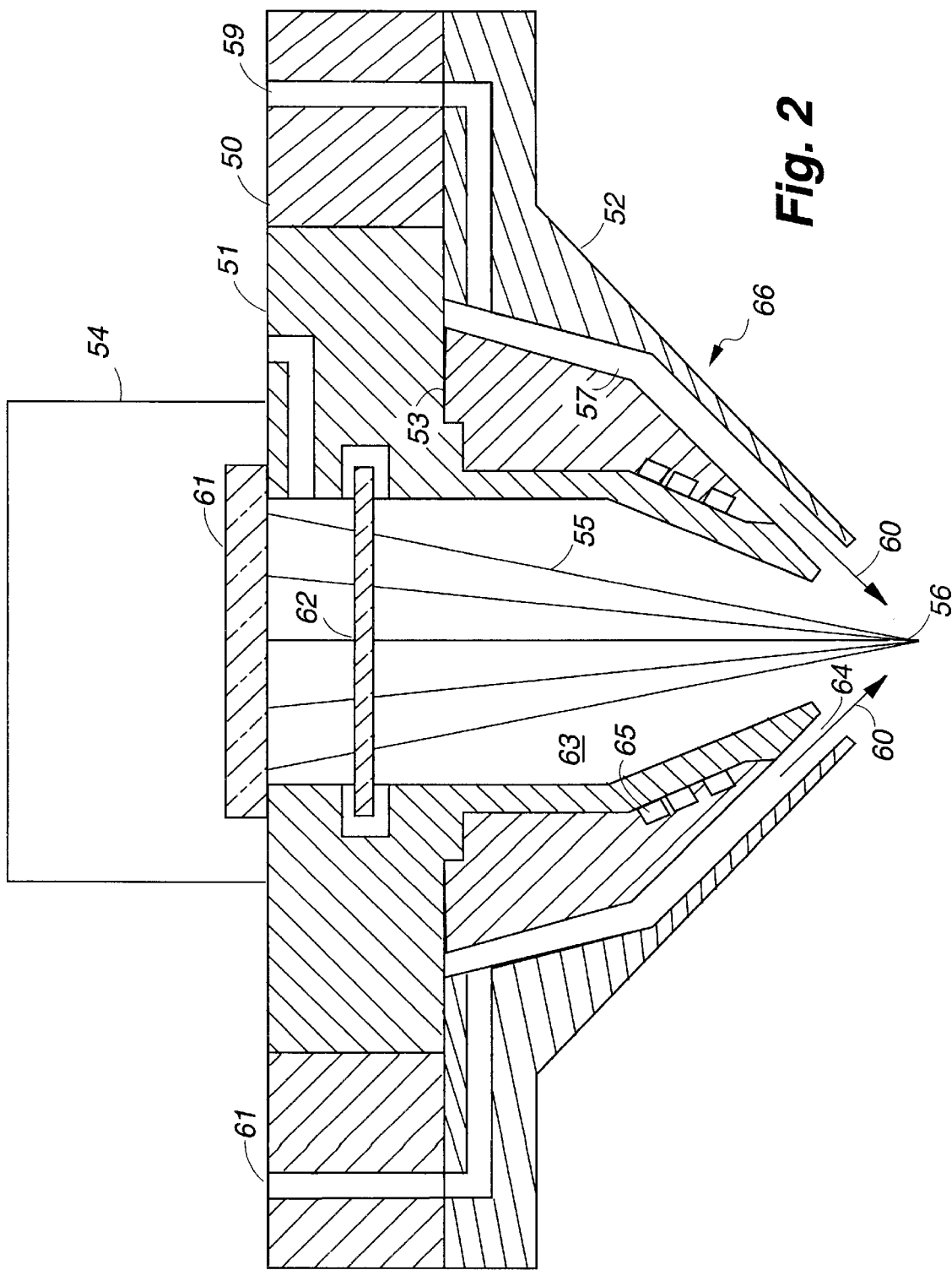
FIG. 2 depicts a delivery nozzle in a sectional view taken along the central axis of the nozzle.

FIG. 2 depicts a deposition head which may be used in practice of the invention. The head is comprised of optics package 54 and delivery nozzle 66. Certain elements of the drawing, such as bolts and seals, are omitted for drawing convenience and clarity. Four primary parts of the nozzle are shown: outer ring 50, housing 52, chill block 53, and inner element 51. The delivery nozzle itself is an object which lends itself to fabrication by means of the present invention, thereby reducing the number of parts needed to make a complete nozzle. Reference number 5 indicates a commercially available optics package for receiving and focusing laser light which is mated to the delivery nozzle. Laser beam 55 passes through windows 6 and 62 and central passage 63 and is focused at the point denoted by reference number 56. Powder is discharged from annular space 57 through delivery port 64 as indicated by arrow 60. In this delivery nozzle, the annular space constitutes powder delivery passages through which powder flows to the deposition zone. The lower portion of annular space 57 is formed by the exterior surface of one frusto-conical shape and the inner surface of a second frusto-conical shape disposed on a common central axis. The angles between the central axis of each shape and its surface may be identical, so that the annular space is of constant width, as shown in FIG. 2, or the angles be different, so that the width of the annular space varies. Powder in a carrier gas is supplied to annular space 57 through powder channels 59 and 61 and two other powder channels which are not shown due to the manner in which this view is drawn. It is preferable to provide at least four powder channels in order that powder will be uniformly distributed around the annular space and converge on the deposition zone from all points of powder delivery port 64. Windows 61 and 62 are of quartz and serve to protect optics package 54 from heat and particulate matter. Window 61 is fixed and window 62 is mounted in a movable slide (not shown) so that it can be removed from the nozzle for cleaning and replacement. An inert gas such as argon, provided through gas channel 51, is flowed through the space between the two windows in order to provide further protection for the optics package. Channels are provided for escape of the gas (not shown). The lower end of the nozzle is provided with means for removing heat. Water passage 65 is provided with cooling water, or other fluid for that purpose, by a channel (not shown) connecting to its lower end and the water is removed via a channel (not shown) communicating with the upper end of the water passage. Water passage 65 is a groove in the form of a helix which is machined into the surface of chill block 53. The outside wall of inner element 51 forms a closure for the groove.

Figure 3:
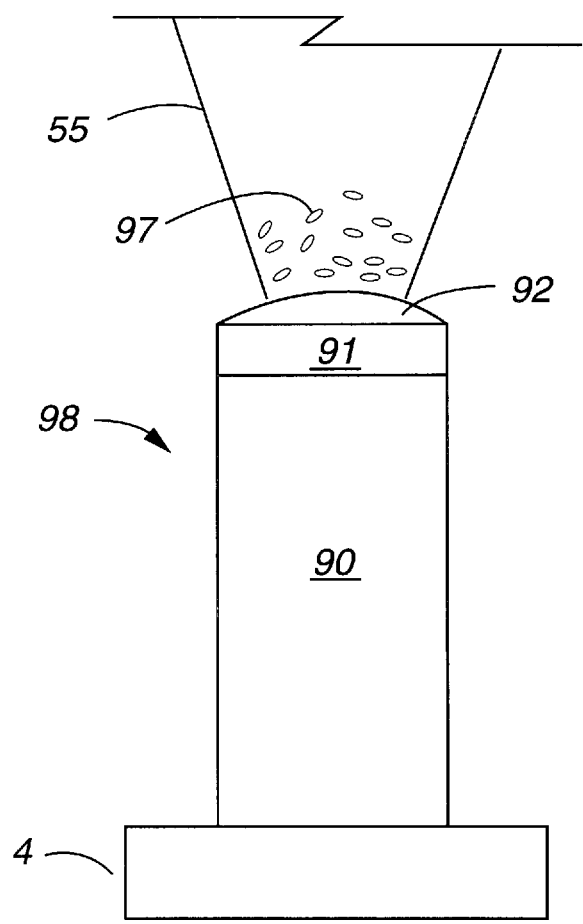
FIGS. 3 and 4 schematically depict articles which are in the process of formation.
Figure 4:
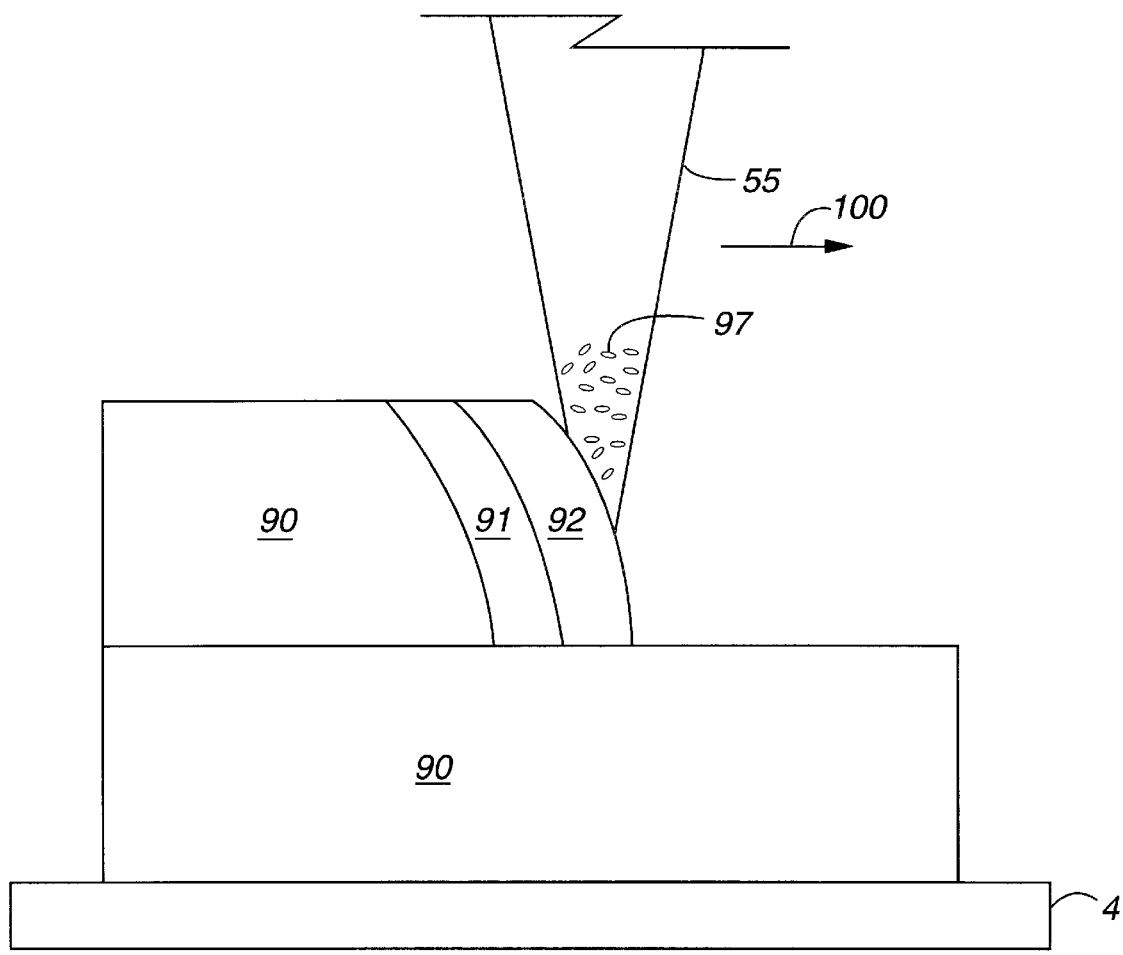

FIGS. 3 and 4 each depict an article which rests on support 4 and is in the process of formation by use of laser beam 55. Particulate matter, or powder, is represented as shown by reference number 97. FIG. 3 shows rod 98, which is made by moving the deposition zone only in a vertical direction. Rod 98 consists of solid zone 90, mushy zone 91, and liquid zone 92. The sizes of these zones, the laser beam, and the powder are for drawing convenience and are not intended to show size relationships. Mushy zone 91 is the transition space, where solid dendrites are growing, or solidifying, between the already solidified portion of the rod and the material which is liquid form. In FIG. 4, the first pass of the delivery nozzle produced solid portion 95 of article 99 and the second pass is in progress. The second pass has caused to be formed the portion of article 99 denoted by reference number 94, which portion has solidified. The direction of movement of the laser beam is to the right, as shown by arrow 100. Mushy zone 95 separates solid zone 94 from liquid zone 96.

Figure 10:
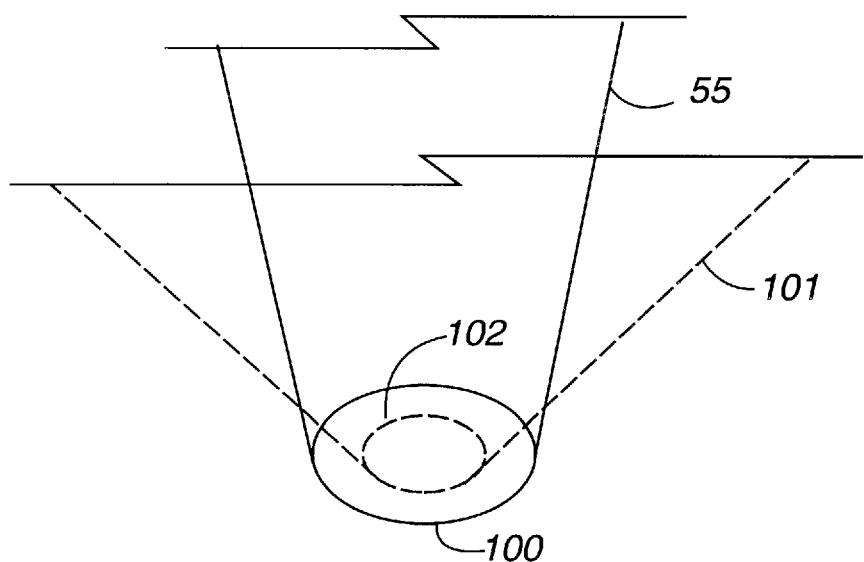
FIG. 10 depicts a laser beam and stream of powder. It is not to scale.

FIG. 10 depicts the end portion of a laser beam and powder stream when the deposition head is vertically oriented, that is, when its axial centerline is vertical. The exterior envelope of the generally conical beam is shown by reference number 55. Laser spot 100 is the pattern formed by laser light on a plane which is normal to the central axis of the beam and located at the article being formed. When the deposition head is operating in a position other than vertical, powder particle velocity should be increased, in order to overcome gravitational effects which may cause bending of the powder stream. The powder delivery spot 102 may assume an oval configuration and the center of the spot may not be coincident with the central axis of the delivery nozzle when the delivery nozzle of FIG. 2 is tilted. It can be seen that the force of gravity may cause the concentration of powder in the 360° annular space of that nozzle to vary with location, due to the fact of the plurality of powder paths not being separate from one another. A new delivery nozzle is being fabricated for use with a new DLF system which will have discrete powder paths. While it is convenient to visualize the laser beam as focused at a single point, available optical apparatus is not capable of accomplishing this, so the diameter of the laser spot has a minimum value fixed by the optics. The focal point is also termed the theoretical diffraction-limited spot. The size of the focal zone will normally be about 0.060 in. (1.5 mm) above and below the focal point. The deposition head may be positioned such that the laser spot may be located above, below or at the focal point. Maximum energy density of the beam is at the focal point and energy density is less at points above and below the focal point. Reference number 102 shows a powder delivery spot and dashed lines 101 indicate a conical delivery envelope for streams of powder converging in the deposition zone. The annular delivery nozzle of FIG. 2 will theoretically deliver a stream of powder in the shape of the surface of a frustum of a hollow cone with the smaller end of the frustum being the powder spot; in practice, it is difficult to obtain a uniform 360° powder distribution. However, it is not necessary to have such a uniform curtain of powder, but only that at least two streams of powder enter the deposition zone. These streams must converge within the deposition zone, that is, they must meet in the deposition zone. It is not necessary that all powder leaving the delivery nozzle enter the deposition zone. If only two streams of powder are used, they should enter the deposition zone at about 180° from one another to avoid biasing "growth" of the article being deposited toward the powder exit port of the delivery nozzle. It is preferable to use four or more powder paths entering the deposition zone at equally spaced points. In the case of four streams, it is preferable that they be spaced at about 90° apart. In the apparatus used to make the article of Example 1, the powder spot is larger than the laser spot, causing powder to accumulate around the article. This powder may be recovered and re-used. It is desirable to achieve a powder delivery spot which is equal to or smaller than the laser spot. This will minimize the quantity of powder for recycle and contribute to dimensional precision of the process.

Figure 11:
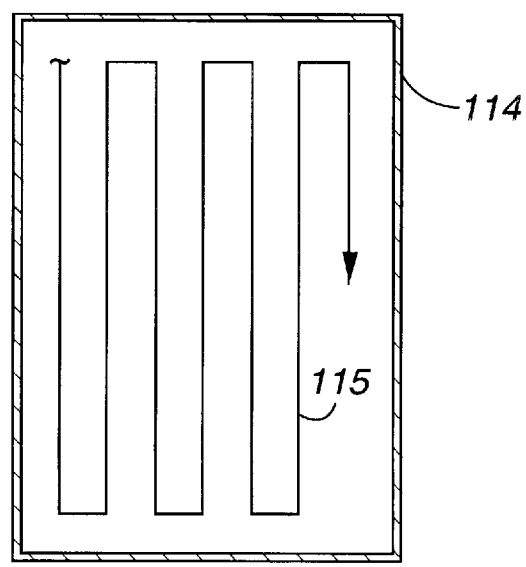
FIGS. 11 and 12 each depict a rectangular portion of an article and a portion of a tool path followed in producing the article. They are not to scale.
Figure 12:
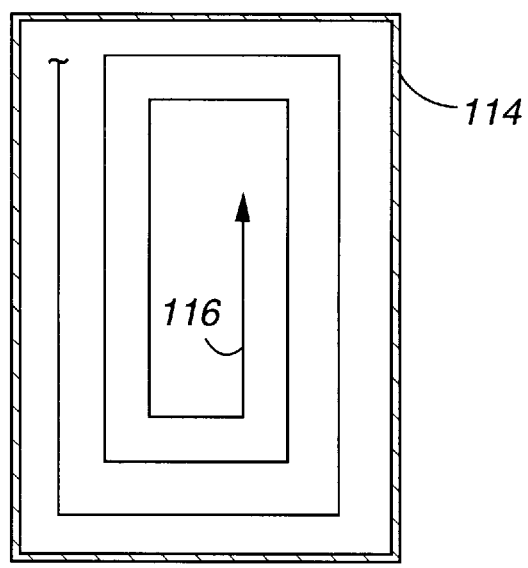
Figure 13:
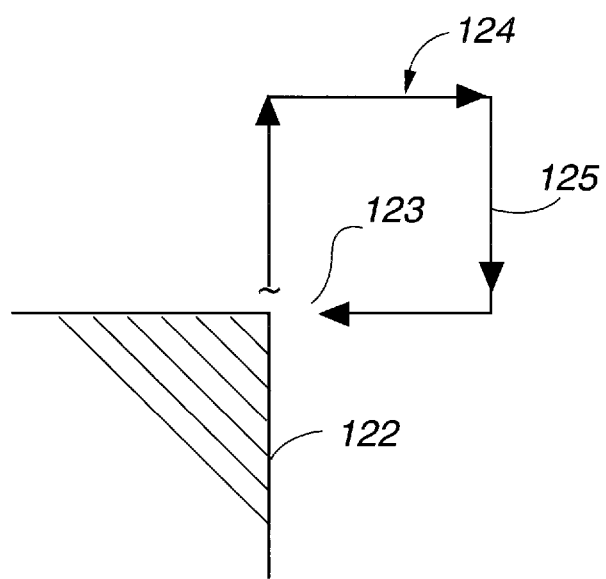
FIG. 13 shows a corner portion of an article and a portion of a tool path which may be used in forming the corner.

FIGS. 11 and 12 are top views of a portion of article 114, which has a rectangular cross-section. Portions of tool paths by which the article may be formed are shown by reference numbers 115 and 116. A layer of the article may be formed by a roughing pass following tool path 115 or 116 and then by a finishing pass which forms the outer portion of the layer. Alternatively, a finishing pass may create a shell and then the shell may be filled in with material using a roughing pass. In a roughing pass, operating parameters are established which maximize rate of material deposition, while parameters for a finishing pass are optimized for dimensional precision and surface finish.

Figure 5:
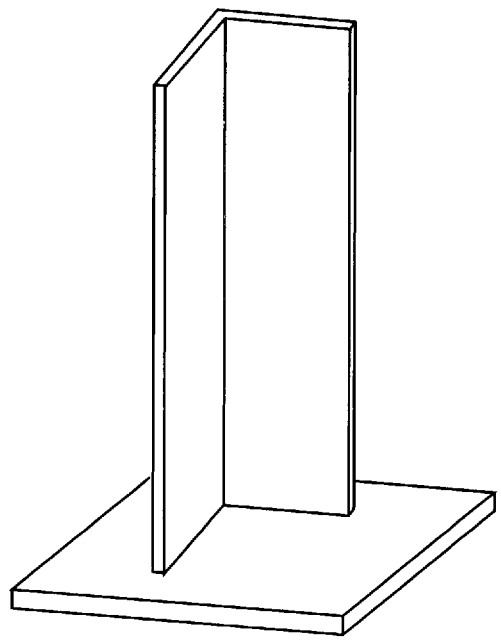
FIGS. 5, 6, 7, and 8 depict articles which were fabricated using this invention. The articles are not to scale.
Figure 6:
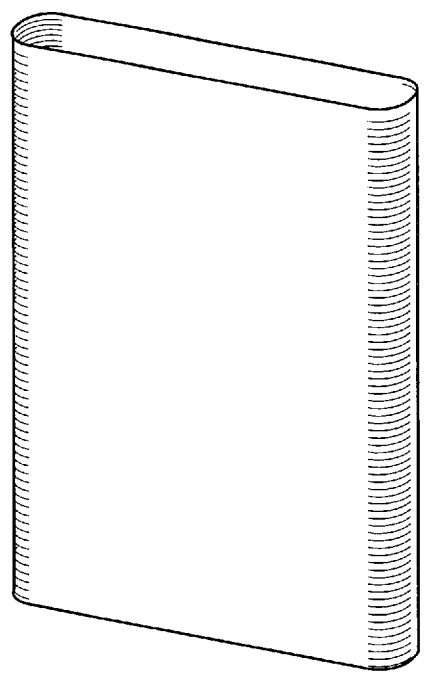
Figure 7:
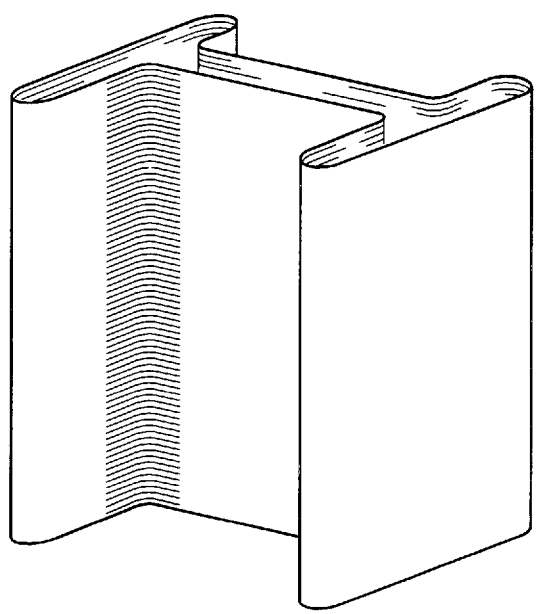
Figure 8:
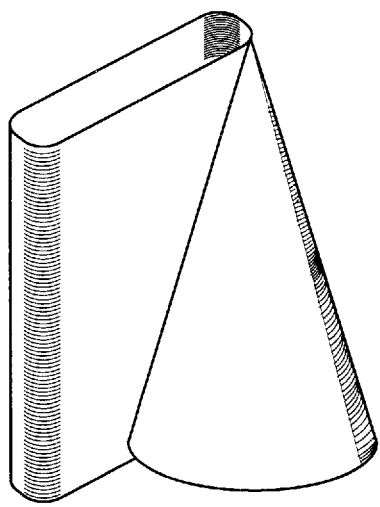

FIGS. 5, 6, 7, and 8 depict articles which were made using a deposition head similar to that depicted in FIG. 2 with a three axis movement system. The article shown in FIG. 5 is commonly called an angle iron or an angle; the article formed was the angle and it is shown resting on the article support which was used in fabricating the angle. The articles of FIGS. 6, 7, and 8 are shown after the article supports were removed. Following is information on fabrication of the angle which will serve to describe practice of the invention.

EXAMPLE 1

Article: angle (as shown in FIG. 5)
Dimensions: 0.405 in. (10.3 mm)×0.405 in. (10.3 mm)×2.7 in. (68.5 mm) long, 0.071 in. (1.8 mm) wall thickness
Material: Type 316 stainless steel
Laser power and type: 450 W, Nd-YAG, pulsed Deposition velocity: 0.625 in./sec. (15.88 mm/sec.)
Powder mass flow rate: 0.20 g/sec. Laser spot diameter: 0.040 in. (1.016 mm)
Fabrication Time: 14.6 minutes
Article Weight: 14.7 g In making the angle using the three axis apparatus, three lasers were used and the laser light was provided to the optics package by means of three fiber optic cables, one for each laser. The lasers were operated in a pulsed mode and fired sequentially at the rate of 50 pulses/sec. Pulse length was 6 milliseconds. Energy input to the deposition zone resembled that of a continuous wave laser, since the total laser-on time for each sequence of three pulses, one from each generator, was 18 ms out of 20 ms available at the 50 pulse/sec. rate. Power output of each generator was 3 J/pulse, for a total of 450 W (3 J/pulse×3 lasers×50 pulses/sec.). The deposition velocity is the rate at which the delivery nozzle moved in the X-Y plane while deposition took place. The article was produced using about 675 deposition passes, with each pass adding about 0.004 inch (0.1016 mm) to the height of the angle. Thus, the angle consists of about 675 deposition layers. If a thicker wall had been desired, one or more additional passes would have been made for each layer. Several laser passes were made before powder flow was started, for the purpose of preheating the article support in order to promote better adhesion of the first layers of the article and to enhance dimensional accuracy of the base portion of the article. Only a portion of the powder flowing out of the delivery nozzle was melted and became part of the article; the portion not melted collected around the base of the article.

The apparatus used to accomplish movement of the deposition zone to form the angle and the articles of FIGS. 6, 7, and 8 includes an X-Y table comprised of an X-axis positioner and a Y-axis positioner as described above in connection with FIG. 1 and a Z-axis positioner for raising and lowering the delivery nozzle. The Z positioner is essentially an X-axis table turned on end. This apparatus was supplied by Anorad Inc. of Hauppauge, NY. An Anorad axis controller is used to drive the X, Y, and Z tables, open and close a shutter located at the laser generation equipment, switch the powder feeder on and off, and control gas flows. The Anorad equipment includes optical sensors which close the control loop by providing control signals representing positions of the X-Y table and the Z positioner to the controller. Deposition speed was constant, excepting the deceleration which necessarily takes place when movement along the X-axis stops and the acceleration which takes place when movement along the Y-axis starts. This movement is needed to form the corner portion of the angle and speed changes are inherent in turning a corner with this equipment. Powder flow out of the delivery nozzle was maintained at a constant value throughout deposition of the angle, even while motion of the deposition zone was momentarily stopped at the corner. The laser shutter remained open and power output of the laser was constant during deposition, including while the deposition zone turned the corner.

The deposition head used to form the angle was that depicted in FIG. 2. The width of annular space 57, measured normal to arrow 60 is 0.0433 in. (1.01 mm) and the walls of the lower portions of housing 52 and chill block 53 form an angle of about 44° with the vertical, so that the cone angle is about 88°. The inner diameter of inner element 51 at its lower end where the laser beam passes through is 0.350 in. (8.89 mm). The laser beam may be pictured as a cone with an angle of about 13° from the vertical, so that the total included angle of the cone is about 26°. The vertex of the cone, denoted by reference no. 56, is 0.25 in. (6.35 mm) vertically below a horizontal plane containing the circle formed by the innermost corner of the lower portion of inner element 51. As mentioned above in connection with FIG. 10, the focal point of the beam is a theoretical concept. The powder delivery spot has a diameter of 0.30 in. (7.62 mm). The focal point of the powder, that is, the vertex of a cone whose sides are centered in annular space 57, is 0.0896 in. (2.28 mm) vertically above the focal point of the laser beam.

Dry argon was flowed across the deposition head windows as described above in connection with FIG. 2 and flowed into the deposition chamber, or enclosure. Pressure in the chamber was maintained slightly above atmospheric, at several inches of water gauge. The oxygen concentration in the deposition chamber during deposition of the angle was about 30 ppm. The powder was removed from a powder container by an auger feeder and fed into the throat of a venturi having a carrier gas flowing through it. The gas transports the powder from the venturi through a conduit to a splitter block having four outlets for conduits which provide four streams of powder to the four powder channels of the nozzle of FIG. 2. The powder feeder was located in a separate chamber whose atmosphere may be controlled rather than in the same chamber as the Anorad positioners. Inlet pressure of the carrier gas supplied to the venturi, which was argon, was about 30 psig. The required pressure is dependent on powder size, size of the powder feed equipment, and length of powder conduit runs. Those skilled in the art are familiar with methods of establishing size of gas and powder apparatus such as was used to make the angle and with other equipment which may be used to control mass flow rate of powder and gas flows. Excess powder was not automatically recycled; it accumulated about the base of the article.

The articles of FIGS. 6 (termed a slot), 7 (hollow I-beam, and 8 (slot and cone) were made using the apparatus and parameters of Example 1, except that deposition velocities were 0.49, 0.42, and 0.50 in./sec. respectively (1.24, 1.07, and 1.27 (mm/sec.). Dimensions are shown in Table I.

TABLE I

Slot: 1.5 in. (38.1 mm) long × 0.25 in. (6.35 mm) wide × 2.56 in. (65 mm) high, 0.075 in. (1.905 mm) wall thickness, 0.25 in. (6.35 mm) end radii
I-beam: 2.2 in. (55.88 mm) long × 1.15 in. (292.1 mm) flange width, 0.070 in. (1.778 mm) thick wall
Cone and Slot: Slot - same as above, Full cone dia. - 0.9 in. (22.86 mm), cone angle - 30°, wall thickness - 0.71 in. (18.034 mm)

Table II shows diameters of 7 rods which were made on the three axis laser deposition apparatus of Example 1 in order to investigate repeatability and dimensional tolerances. Each rod was about 1.5 in. (38.1 mm) long and the diameter was measured at three points on each rod: at about the middle and at about 0.125 in. (3.175 mm)from each end.

The average of the 21 measurements is 0.069 in. (1.75 mm) and the standard deviation of the set is 0.0044 in. (0.1118 mm). This and other experimentation indicates that articles having a dimensional tolerance of about plus or minus 0.004 in. or 0.1 mm may be produced using the three axis apparatus. The rods were made in accordance with the parameters of Example 1, except that powder mass flow rate was 0.25 g/sec. and deposition velocity, that is, the rate in./sec. (2.24 mm/sec.). Also, the power level was 1.1 J/pulse and the pulse length was 6.6 ms, for a total power output of the three laser light generators of 165 W.

TABLE II

| Rod No. | Diameter, In. (mm) | Rod No. | Diameter, In. (mm) |
|---|---|---|---|
| 1 | .067 (1.7018) | 5 | .062 (1.5748) |
|   | .071 (1.8034) |   | .060 (1.524) |
|   | .073 (1.8542) |   | .065 (1.651) |
| 2 | .073 (1.8542) | 6 | .070 (1 778) |
|   | .075 (1.905) |   | .065 (1.651) |
|   | .067 (1.7018) |   | .067 (1.7018) |
| 3 | .071 (1.8034) | 7 | .065 (1.651) |
|   | .073 (1.8542) |   | .065 (1.651) |
|   | .075 (1.905) |   | .067 (1.7018) |
| 4 | .069 (1.7526) |   |   |
|   | .074 (1.8796) |   |   |
|   | .070 (1.778) |   |   |

Examples 2 and 3 provide conditions used for deposition of tungsten and nickel aluminide. In making the rod and wire, the deposition head was moved only in an upward direction. Since tungsten has a high melting point, the molten pool and thus the wire diameter, was relatively small. A Type 316 SS wire formed under the conditions of Example 2 would have a diameter of about 0.067 in. (1.7 mm). Plates and rods were also made using powder of molybdenum disilicide, P-20 tool steel, 410 stainless steel, iron/25% nickel, and silver/copper mixtures.

EXAMPLE 2

Article: wire
Dimensions: 2.8 in. (71.1 mm) long×0.025 in. (0.63 mm) dia.
Material: Tungsten Laser power and type: 68 W, Nd-YAG, continuous wave
Deposition velocity: 0.023 in./sec. (9.59 mm/sec.)
Powder mass flow rate: about 0.03 g/sec.
Laser spot diameter: 0.020 in. (0.508 mm)
Fabrication time: 2.03 min.
Article weight: 0.36 g

EXAMPLE 3

Article: rod
Dimensions: 3 in. (76.2 mm) long×0.051 in. (1.23 mm) dia.
Material: nickel aluminide
Laser power and type: 65 W, Nd-YAG, continuous wave
Deposition Velocity: 0.083 in./sec. (2.1 mm/sec.)
Powder mass flow rate: 0.37 g/sec.
Laser spot diameter: 0.02 in. (0.508 mm)
Fabrication time: 0.6 min.
Article weight: 0.47 g The articles described above were thin in horizontal cross-section. In order to demonstrate fabrication of an article requiring multiple passes in a single horizontal plane, a plate having a height of 1 in. (25.4 mm) and plan dimensions of 0.75 in. (19.05 mm)×0.375 in. (9.52 mm) was made. The number of 19.05 mm long horizontal passes required to make the 9.52 mm thick wall was about 12.

The DLF process is capable of producing articles having a wide range of densities expressed as a percentage of theoretical density of the material of the article. Low-density articles may be fabricated by increasing deposition velocity and reducing powder flow rate so that the size of the molten pool is small, leaving voids in the deposited material. A stainless steel plate was made through which light passed; it had a density of 75% of the theoretical value. For comparison, density of powder is about 30 to 35%, that of cold-pressed powder is about 50 to 55%, and that of hot-pressed powder is usually 80% or more. Articles of 100% density have been produced.

Powder sizes used in making articles with the three axis apparatus ranged from about 270 mesh (0.025 mm) to about 100 mesh (0.149 mm). The angle between central axis of a laser beam and the central axes of the powder passage may be from about 20 to about 75 degrees.

The DLF molten pool was generally about 10% of the size of a molten pool obtained when doing TIG welding. Dimensional accuracy is improved by decreasing the size of the molten pool. Size of the molten pool is dependent upon such factors as laser beam power, absorptivity of the material being heated, and heat flow away from the pool.

Another laser deposition system is presently being constructed. Laser welding apparatus which is designated Lumonics MW2000 by the manufacturer is being incorporated into the new DLF system. This apparatus includes a 5 axis positioning system (designated Model 550) supplied by the Laserdyne Division of Lumonics Corp. of Livonia, Mich. A Laserdyne System 94 Controller will be used. The optics package component of the deposition head, which is capable of providing a laser spot having a diameter of 0.5 mm, is provided by Laserdyne. It is expected that the maximum deposition rate for the new system will be in excess of 2 g/sec. The new apparatus includes a Z-axis positioner to move the deposition head in a vertical direction and a table on which an article support is placed so that the support can be moved along the X-axis, along the Y-axis, and rotated about a vertical axis. The table will be cooled to prevent damage due to heat transferred to it during fabrication of an article. Cooling water will be circulated such that it contacts the lower surface of the top plate upon which rests a support for fabrication of an article. A circular trough will surround the table for collection of excess powder. During and after fabrication of an article, flow of powder may be discontinued while the powder carrier gas is left on and the depositon head moved so that excess powder is blown into the trough by the carrier gas. It is anticipated that powder will be continuously removed from the trough. This may be done by providing one or more narrow serpentine paths leading from the bottom of the trough to the throat of a venturi, through which gas is flowed in order to carry away the powder. The table will be designed so that an article support or fixture or partially finished article can be placed on it or clamped to it. A fixture may be used to hold a support or partially finished article in a particular position chosen by a designer as optimum for fabrication of the article. An article may be manually repositioned at a particular point in its fabrication sequence.

Figure 9:
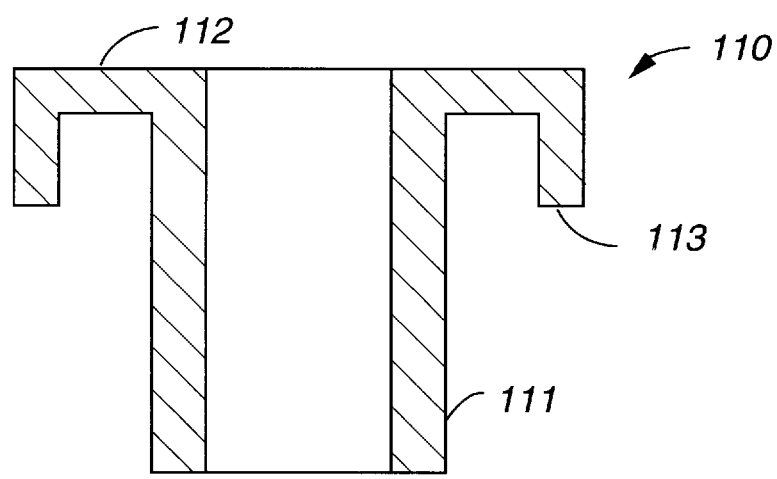
FIG. 9 is a vertical section view of an article which is presented to illustrate the capability of the present invention to produce articles having overhanging structures.

The deposition head of the new system will have the capability of rotating 135 degrees from the vertical in each direction in a single plane, in the manner described in connection with FIG. 1, though by means of a different type of apparatus. Thus, the new system will provide the capability of depositing material in a sideways direction and an upward direction, that is, on the bottom side of a feature of an article. This is illustrated by reference to FIG. 9, which is a sectional view of flange 110. First, the large vertical portion of the flange, denoted by reference number 111 is deposited with the delivery nozzle in a vertical or near vertical position so that the laser beam and powder stream are directed in a downward direction. Then, the delivery nozzle is rotated to produce the horizontal portion of the flange denoted by reference number 112. Lastly, the nozzle is rotated further, so that the laser beam and powder stream are directed upward at an angle of up to 45 degrees to the horizontal, in order to produce the overhanging vertical portion of the flange denoted by reference number 113. The normal deposition head orientation is such that the axial centerline of the head will pass through the center of the deposition zone. However, the new system has a higher power laser than the three-axis apparatus and may be operated with the laser head slightly tilted from this position, perhaps at a tilt angle of about 20°, to avoid reflection of light from the deposition zone into the laser delivery system. Such reflections may cause damage to optical components. It may be necessary to tilt the head when fabricating an article of aluminum, which is quite reflective, whereas a normal head orientation may be used for a stainless steel article, since SS is less reflective than Al.

The new system will utilize a 2 kW maximum continuous wave Nd-YAG laser having one lasing cavity with four lasing rods. Peak power in pulsed mode will be 5.4 kW. The generator will be capable of operation in a pulsed mode or with any degree of modulation. The laser light will be delivered to the deposition head by use of a fiber optic cable and mirrors.

Movement of the deposition zone and controlling functions such as powder feed rate could be done manually, but it is very difficult to achieve specific article dimensions when doing so. Attempts to manually grow articles were considered to be unsuccessful. Practically, it is necessary to utilize CNC machining motion apparatus to accomplish precise movement of the deposition zone. Such apparatus is normally sold with a controller which provides control signals to the motion apparatus which accomplishes relative motion between a workpiece and a cutting tool. A controller also provides other machine control commands. For example, to carry out a conventional machining operation of grooving an article, a CNC milling machine controller may be programmed so that it causes movement of the spindle of the machine, and thus the cutting tool contained in the spindle, downward from a starting location (this is termed a plunge) to a point near the edge of a flat plate, causes rotation of the spindle to start, and then causes movement of the tool along the X axis of the machine for a specified distance, thereby cutting a straight groove in the plate. After cutting the groove, the spindle may be moved upward (this is termed a retract) to its starting position or to another position in preparation for another plunge. Just before starting the cutting movement, the controller may provide a signal which causes a cutting fluid, or coolant, to start flowing to the location at which cutting is taking place. The milling machine controller may also have spare, or user-defined, control commands available so that the user may program the controller to send a voltage to a set of terminals at a particular point in the machining sequence. For example, if the machine does not have the capability for automatic changing of cutting tools, a spare command may be used to sound a buzzer to alert an operator to change the tool. The controller of a CNC milling machine is normally provided to a customer with software which a technician may use to program the controller. For example, in creating a machine operating program, the technician may add the lines of code "P102" and "M108". This, in accordance with the protocol established for the machine by its manufacturer, "tells" the machine to execute a plunge and then to turn on coolant flow at the point in the operating sequence at which the lines of code are located. The movements of the spindle are called "tool paths" and commands such as "coolant on" are referred to as being embedded in the tool paths. A simple machining sequence, such as the grooving operation described above, is easily created by a technician by use of the programming software. However, controllers of sophisticated CNC milling machines are usually provided by the user with machine operating code which is created by use of commercially available software, thus avoiding the laborious task of programming a sequence of motions and commands for the controller line-by-line.

The deposition head and article support of this invention are mounted on commercially available motion apparatus. Movements of the deposition head, article support, and control commands can be programmed into a controller in the same manner as if a cutting tool were mounted on the motion apparatus. In practice of this invention, the singular term "tool path" is used to refer to the total sum of the movement of the deposition zone required to produce an article. Also, terminology specific to CNC machining is used for purposes of convenience and clarity. For example, the laser deposition apparatus may be referred to as a machine. A preferred embodiment of this invention utilizes commercial software, though significant modifications to the software are made, to create electronic files which reside in a digital computer. It is more efficient to adapt CNC software for use in DLF than to create thousands of lines of machine code from scratch. The adaptation process generally will be carried out just once. Of course, a DLF sequence may be programmed line-by-line, using the machine commands provided by the machine supplier.

The steps required to create a machine operating program by means of commercial software for creation of an article using the inventive apparatus are:

1. Create the design of an article, that is, specify the shape and dimensions of an article, by using a commercially available computer-aided design (CAD) program. This is termed the design file.

2. Adapt a commercially available computer-aided manufacturing (CAM) program for use in laser deposition.

3. Create a cutter location (CL) program, or CL file, using the adapted CAM program and the design file created in Step 1.

4. Create a post-processor (PP), which is a computer program specific to the machine.

5. Create a machine operating file by applying the PP to the CL file.

6. Edit the machine file, if necessary. The machine file is then loaded into the machine controller.

A CAD program is used to create a representation of an article in electronic digital form, that is, to create the design file. This type of program is commonly used to produce drawings of all types in place of pencil, paper, and a drafting table. The CAD program which is now used in practice of this invention is Pro/Engineer, supplied by Parametrics Technology Corp. of Waltham, MA. A combined CAD/CAM program which has been used is ICEM-EDN, supplied by ICEM Systems, a subsidiary of Control Data Corp. of Minneapolis. Other CAD programs are on the market. The CAD program was not adapted to be specific for use in practice of this invention, but was used in an as-purchased condition. However, in creation of the design file for an article, the designer may take advantage of the capabilities of the laser deposition process which are unique to it. For example, an article produced by conventional means may have no internal cavities because it is more efficient to machine it from a single billet than to make two or more parts and then join them together. Using this invention, the same article might be hollow with internal ribs used to provide strength only as necessary. This design would, in comparison to a solid design, yield a shorter fabrication time and require less raw material.

An adapted CAM program is used to create a CL file, using the design file to provide the specification of the article. The CL file contains the tool path and generic control commands which need to be executed at points on the tool path in order to fabricate a particular article. The CAM program must be linked to the CAD program, that is, the CAM program must be capable of "talking" to the CAD program. The companion CAM program to Pro/Engineer which is now used in the DLF process is Pro/Manufacturing, also supplied by Parametrics Technology. Other programs are commercially available.

A standard commercial CAM program must be adapted for DLF use. Adaptation is done by means of features provided in the program; it is not done by modifying the source code. With a minimum amount of adaptation, the functions of a standard CAM program are sufficient to automatically create DLF tool paths for certain articles and article features. A feature is a portion of an article. For example, a CL file for making an I-beam similar to that of FIG. 7 was created by using the mirror function of Pro/Manufacturing; a tool path for conventional machining was created and then mirrored, thus creating the DLF tool path. However, utility of the DLF process would be severely limited if only the minimum amount of adaptation required to use the automatic functions of a commercial CAM program is accomplished. Those familiar with use of CAM programs for creation of machine files for producing articles by use of CNC apparatus will be enabled to accomplish the adaptation process by the information provided herein.

User-defined functions can be established within the CAM program for use in creating tool paths for particular feature forms which will appear in a number of different articles. A user-defined function is similar to a macro in a word processing computer program. Establishing a user-defined function during the process of adapting a CAM program permits a feature to be specified, when using the adapted program to create a CL file, by a few key strokes instead of many. A user-defined function for creating a feature of a particular form may be created by passing a plane through the feature (electronically, not literally). The program is then "told" that the planar figure created in the plane at the intersection with the feature is a first portion of the tool path. The designer then passes a second plane through the feature, where the location of the second plane is specified with reference to the location of the first plane. A common location for the second plane would be parallel to the first plane. The second plane defines a second portion of the tool path. Then, the end of the path in the first plane is joined to the beginning of the second path by a movement command. This process is continued until the tool path required to make the feature is complete.

In adapting a commercial CAM program, unneeded control commands may be replaced with commands applicable to this invention. For example, the "coolant on" command, which is not needed in the DLF process, may instead be used to open the laser beam shutter; "coolant on" is simply replaced by "shutter open". A CAM program has a library of cutting tools from which a designer chooses as he works with the program in the process of producing a CL file. Custom tools may be added to the tool library by a user. Adapting the program for DLF use includes defining a deposition head as a custom tool. The deposition zone corresponds to the cutting edge of a conventional tool. The CAM program displays the deposition head for use by a designer in creating the CL file. This also permits identification of conflicts between the head and the article, so that the head does not bump into an already-formed feature during fabrication. Information on materials which will be commonly used is added to the CAM program, so that weights and moments of inertia of articles can be calculated. Such calculations take place during creation of the CL file.

Default parameters are placed in the CAM program. These are the operating parameters which are used unless the designer specifies different parameter values. Normally, the default parameters are those that provide a high rate of deposition. A different set of default values is provided for each material. For example, for the same laser power level, powder flow for steel will be higher than for tungsten because of the higher melting point of tungsten. The default position for the deposition head may be with its central axis normal to the location on an article where deposition is taking place when stainless steel powder is used and the default position when aluminum is used may be with the axis tilted for the purpose of avoiding damage to the optics, as mentioned above. Sets of parameters for particular functions will be added, so that the designer can simply specify, for example, "finishing parameters 1" or "finishing parameters 2" or "corner type 1" instead of entering values for each parameter to accomplish a particular type of finishing operation or make a particular type of corner. Of course, a designer will be able to manually specify any parameter at any point on the tool path.

A commercial CAM program may provide the capability of modifying the program's user interface by doing original programming. Parametrics Technology provides Pro/Develop, a program which allows modification of Pro/Manufacturing by programming in the C language.

Adaptation of a CAM program for DLF use need only be done once for any particular DLF apparatus. The adapted program may, of course, be further adapted from time to time. For example, a designer in the process of creating a CL file may decide to add a new user-defined function to the CAM program rather than manually creating a tool path for a particular form of feature each time he designs an article with that feature.

To create the CL file for an article, the design file is imported into the adapted CAM program and many design choices are made. The designer must specify the deposition parameters. Information added to the CAM program during the adaptation process is used. For example, the designer may specify that a feature is to be of aluminum, is to be made starting at the center of the feature with roughing passes, and that the feature is to be completed with finishing parameters. Powder flow rate, carrier gas pressure required for that flow rate, deposition speed, laser power level, type of carrier gas, etc. were previously entered for roughing, that is, for a maximum deposition rate, so that the designer does not have to enter the individual parameters. Similarly, sets of finishing parameters were previously entered, so that the designer need only specify, say, "finishing parameters 1". Finishing parameters are those used to obtain maximum dimensional accuracy and include, for example, a lower powder feed rate than is used for roughing deposition passes. If the designer wishes to use sets of parameters which were not entered as sets when the CAM program adaptation was done, he enters the individual parameter values.

Figure 14:
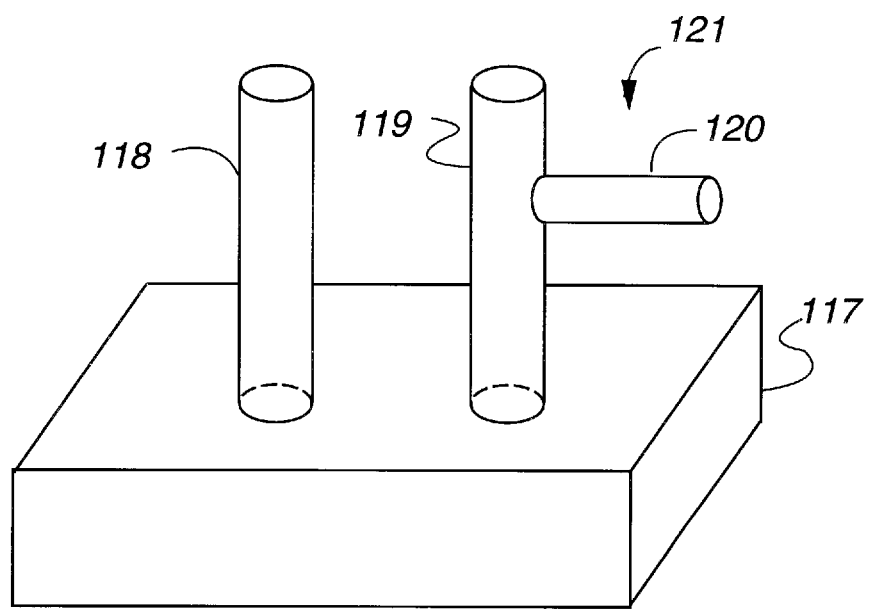
FIG. 14 depicts an article for purposes of illustrating practice of the invention.

The designer must choose the machining volume, or deposition volume. This is done by defining surfaces by means of intersecting planes and/or by selecting features. User-defined functions previously established are used by the designer to specify features. Alternatively, the designer may manually define the tool path for a feature by use of planar layers, as described above. The order in which features of a part are to be grown is selected. For example, referring to FIG. 14, base 117 of article 121 must be made before cylinder 118 is made. If cylinders 118 and 119 are sufficiently close together that the deposition head will conflict with one cylinder while depositing the other, they cannot be completed sequentially. That is, deposition must be alternated between the two cylinders. If they are far enough apart that the deposition head will not bump into a completed cylinder while the second is being grown, it is desirable to grow them sequentially because it will not be necessary to move the head from one to the other numerous times. The sequence and method of building arm 120 must be specified. Cylinder 119 could be grown to a height at the point where arm 120 branches off, arm 120 could be grown, and then cylinder 119 would be completed. Alternatively, cylinder 119 could be grown to its full height and then arm 120 would be grown. In this case, it might be necessary to tilt the deposition head to avoid a conflict with cylinder 119. Arm 120 might be grown in a horizontal direction, that is, by depositing layers in a vertical plane, or it could be grown by deposition in a series of horizontal planes.

While creating the CL file, DLF process characteristics must be considered. If an article has an open cavity, it may be preferable to orient the article such that the cavity faces downward rather than upward, so that excess powder will fall out of the cavity. If an article has an otherwise closed internal cavity, a drain hole might be left for removal of excess powder.

In creating the CL file, energy density of the laser beam is chosen such that it is sufficient to melt enough powder to maintain the desired deposition rate. Normally, energy density will be contained in a previously entered parameter set. Energy required varies with the primary parameters of powder flow rate and deposition zone speed and secondary factors such as material melting point, thermal conductivity and enthalpy of the material, and article configuration. The amount of energy supplied must be equal to the sum of the amount of heat required to melt the article as the deposition zone moves, the heat required to melt the powder, and the heat lost from the deposition zone by radiation, convection, and conduction. Heat loss is influenced by article configuration. For example, heat flow away from a corner will be less than the heat loss when the deposition zone is in the middle of a large solid article. When the deposition zone accelerates and decelerates, heat input to the deposition zone will change. In addition, changes in direction may produce an overlapping effect in regard to the laser spot. It can be seen that energy input per unit time must be varied as the deposition zone moves along the tool path. This is done by electrically varying output of the laser generator, opening and closing a shutter in the path of the laser light, and/or varying the speed of the deposition zone, that is, the speed of movement of the laser spot. Information previously entered is used. Roughing pass parameters previously entered may include the information that a 90° corner is to be made simply by effecting a 90° direction change in the motion of the deposition head. Alternatively, more precise dimensional control may be desired. To achieve this, "corner type 1" may be specified. This instruction will cause the deposition head to follow a different path, as shown in FIG.

13, which depicts a corner portion, in top view, of article 124. Reference no. 123 denotes a 90° corner and reference no. 125 depicts a path which the deposition head may follow, or a portion of a tool path which may be used, in forming the corner. To avoid the deceleration and acceleration which must take place if the deposition head simply follows the perimeter of the article, the head travels beyond the corner, remaining at its normal speed until it passes over the edge of the article in the outbound direction. The head then follows the path shown and is brought up to normal speed before it crosses the edge of the article in the inbound direction.

The part-specific file, or machine file, is created by operating upon the CL file with the post-processor. The generic commands are stripped from the CL file by the PP and replaced with commands which the controller can "understand". For example, the generic command "laser on" might be replaced with "M108", which "tells" the controller to apply voltage to a set of terminals, thus turning on the laser. The PP is created by a PP builder program using information specific to the machine. The PP builder "asks" for information such as the types of motion available, types of movement available, ranges of the motions, and speed of movement along each axis. It uses this information in creating a PP which is used for creation of all machine files for articles to be made on that machine. Once created, a PP is modified only if the machine capabilities originally entered are changed. The PP builder used in practice of this invention is NC Post Plus, which is supplied by CAD/CAM Resources, Inc. of Rio Rancho, NM. Similar programs may be obtained from CAMAX Systems, Inc. of Minneapolis and other companies.

It may be necessary to edit the machine file created by processing the CL file to compensate for deficiencies in the CAM program and/or PP program which cannot easily be addressed at an earlier step in the process of creating a machine file. Also, it may be undesirable, in certain cases, to make permanent changes in the CAM program and/or PP; these cases can be handled by editing the machine file by a number of techniques, such as global search and replace. It is possible, by means of the CAM program, to place flags, or indicators, at locations in the machine code so that locations can be found for the purpose of editing.

After a tool path with imbedded control commands is created, simulation of fabrication of the article is done electronically. The designer can view the simulated fabrication. Simulation may identify changes which should be made in the tool path and commands.

Any source of laser light capable of supplying sufficient energy to accomplish melting may be used. The laser beam may be a continuous wave (CW), modulated to some degree, or pulsed. Nd-YAG and $CO_2$ lasers are capable of providing high power. A $CO_2$ laser, which operates at a wave length of about 10 microns, must be supplied to a deposition head directly or by means of mirrors, as it would couple with and damage fiber optics. An Nd-YAG laser, which operates at a wave length of about 1 micron, may be supplied by means of a fiber optic, though there are significant power losses at the points at which laser light enters and exits the fiber optic. The choice of pulsed or CW operation is dependent in part on the material being processed. Reflectivity and thermal conductivity of the material is a factor in choice of laser type and mode of operation. The following is illustrative. A 700 W $CO_2$ laser in CW mode will not melt aluminum. An Nd-YAG laser with an output of 400 W average power operated in a pulsed mode will melt aluminum to a depth of about 1.6 mm. The Nd-YAG laser was operated at 10 pulses/sec., 40 J/pulse, and a pulse length of 8 msec. Aluminum melted with the lower power laser because low wave lengths are absorbed to a greater degree than high wave lengths and the pulsed laser deposited energy over a shorter time period. 40 J in 8 msec. is 5000 W. This amount of energy was sufficient to melt aluminum. In the interval of 92 msec. between pulses, the molten pool solidifies, probably about 8 msec. after the end of a pulse. Such melting, solidification, and remelting provides certain advantages in practice of the invention. Stainless steel subjected to the Nd-YAG laser under the above conditions melted to a depth of about 3.2 mm. This is because molten stainless steel is less reflective than aluminum. Stainless steel subjected to the $CO_2$ CW laser at 400 W melted to a depth of about 1 mm. Stainless steel melted when aluminum did not because of the lower reflectivity and thermal conductivity of stainless steel. Heat flowed away from the molten stainless steel more slowly. Too high a rate of energy input to a deposition zone will cause spattering, vaporization of the molten material, and shock waves.

Particle size of the raw material may vary over a wide range. On the upper end, particle size is limited by factors such as availability of powder, flowability, ease of transport by a carrier gas, and sizes of equipment, such as powder passages in a delivery nozzle. Powder of very small size is expensive and presents certain handling challenges. A smaller size powder is likely to be easier to "focus" and result in a smaller diameter powder spot. Dimensional accuracy is improved by decreasing powder size. It may be useful in some applications to preheat powder before it is discharged from the delivery nozzle. This might be done by induction heating with an induction coil surrounding a powder conduit or by means of an auxiliary laser beam directed toward the powder.

It is often desirable to accomplish the DLF process in an inert gas atmosphere. Exclusion of air prevents formation of metal oxides and nitrides. While an article of stainless steel might be formed in air, since oxides will float to the top of the molten pool of the deposition zone and thereby not be incorporated in the article, it is usually preferable to exclude gases which may react with the article being formed. However, there are cases where it may be desirable to utilize an atmosphere containing a reactive gas. For example, a carbon-containing gas might be used in order to react with silcon powder to incorporate silicon carbide into an article. A reducing atmosphere may be desired. Parameter sets which are entered during the CAM program adaptation phase may include specification of gas to be used, so that the controller provides a control signal to apparatus for supplying that gas. Deposition can be carried out in a vacuum chamber or the deposition enclosure can be pressurized. The gases used for carrying powder and protecting the deposition head windows must be chosen with the fact in mind that these gases are discharged into the deposition enclosure.

Preheating of an article support is desirable. This is done by passes of the deposition head without powder flow. Preheating addresses the fact that, without it, the article support will be cold when deposition is started, in comparison to the material on which deposition is done later in the fabrication process. An alternative to preheating is to increase laser power or move the deposition zone more slowly at first. However, this results in the need to make large changes in deposition parameters shortly after start of deposition. It is believed that article quality will be higher if deposition speed and laser power are kept constant and powder flow is started only after one or more passes of the laser beam over the support with powder off.

Strength testing of two Type 316 SS articles made by DLF was done. For one article, yield strength was 29,710 psi (204.8 MPa) and ultimate strength was 66,800 psi (460.6 MPa) and, for the other, the values were 33,350 psi (229.9 MPa) and 70,000 psi (482.6 MPa). Handbook values for annealed Type 316 SS are about 30,000 psi (206.8 MPa) and 75,000 psi (517.1 MPa). A 2 in. (5.08 cm) high plate of Type 316 SS was produced. Vickers hardness tests and elemental analysis were done at points along a vertical dimension of the plate. Of 14 hardness values, 12 fell in the range of 155.8 to 184.5 and the outlying values were 129.8 and 144.7 and were separated from one another by 9 other hardness test locations. The percent ranges of the elemental analysis values were iron: 68–69, chromium: 21–21; nickel: 8.9–9.8, and molybdenum: 8.9–9.8.

Articles formed to date have relatively rough surfaces because the surfaces consist of partially melted particles. It is expected that smoother surfaces will be attained by use of powder of smaller size and by reducing the size of the powder spot. Rough surfaces might also be smoothed by laser ablation, using the laser in a pulsed mode to remove small amounts of material, or by passing the laser beam over the surface in order to melt a very thin surface layer. These operations would be done without powder flow.

A significant advantage of this invention is that it may be used to accomplish rapid solidification processing (RSP). RSP is generally defined as cooling from liquid to solid at a rate of 10,000 K/sec. and greater. Totally metastable material can be produced by means of RSP. For example, an amorphous material with novel properties can be produced by rapid cooling of molten ferromagnetic material. Even without achieving RSP, the invention provides articles having a desirable microstructure. Also, the articles produced were fully dense. Time at high temperature results in vacancy entrapment, larger crystal size, and chemical segregation. The rapid cooling of this invention yields a homogenous microstructure. The direction of solidification is controlled in the inventive process. Thus, anisotropic articles, that is, articles in which certain properties vary along different axes of an article, may be produced.

DLF may be used to produce functionally graded articles by successive deposition of different powders. For example, turbine blades whose tips rotate in contact with a sealing material might be fabricated using a nickel-based alloy powder and, as the tip portion of the blade is formed, using an abrasion resistant material, such as a carbide, boride, or intermetallic compound. Thus, in one blade, material properties could be tailored to the requirements of the operating environment of the blade. In a similar manner, a turbine wheel which is subjected to a high temperature at its rim could be fabricated of two different materials, a high temperature and high creep strength material at the rim and a different material at the hub, where operating temperature is lower. In building a pressure vessel, the highly stressed portions of the vessel could be a high strength material while the balance of the vessel could be of a lower strength material. DLF is well-suited to coating of articles. For example, a hacksaw blade may be coated with tungsten carbide in the toothed section of the blade. Instead of using only a powder for coating, a gas may be added to the DLF enclosure for reaction with a powder. A tungsten nitride coating could be formed on an article by providing tungsten powder to the deposition zone in a nitrogen atmosphere. Discontinuous phases might be introduced; for example, an article might be hardened by periodically feeding tungsten carbide powder to the deposition zone. An alloy article might be produced by co-deposition, that is, feeding powder having two or more component materials. Layered structures are easily fabricated.

An article whose density varies, that is, has different densities at different locations, may be formed by varying laser power and/or deposition zone velocity and/or powder feed rate. Decreasing laser power results in less melting of the powder, thus reducing density. Increasing deposition zone speed produces the same result, as does increasing powder feed rate. The operative principle is that a reduction in heat input per unit of mass causes a reduction in density.

Use of conventional CNC machining apparatus for practice of DLF has been described. However, a deposition head may be mounted on an articulated robot arm and an article being formed might be held by a similar device.

It is desirable that a deposition chamber have an airlock and gloves projecting through sealed glove ports in the manner of a glovebox. These features will allow objects to be placed into the chamber and manipulated without admitting air into the chamber.

It may be desirable to provide means for very rapidly stopping flow of powder to the deposition zone. If the powder feeder and/or the carrier gas flow is simply stopped, powder already in the system may continue to dribble out of the nozzle. This may be prevented by providing a source of gas to blow the powder away from the deposition zone.

A desirable feature is a distance sensor to measure the distance between the tip of a deposition nozzle and an article. It is expected that values from such a sensor would be used in real-time to control the distance at a constant value.

Computer modeling of heat flow into, through, and out of an article may be done and the data generated from such modeling may be imported into the CAM program to aid in designing a tool path and control commands.

Process parameters for deposition are chosen by supplying an amount of energy required to establish a molten pool on an article or article support for a chosen deposition speed and powder mass flow rate. The energy supplied must equal the heat needed to melt the volume of material that is in the molten pool plus the heat lost to radiation, convection, and conduction into the deposit. Any set of operating parameters chosen for the process are affected by variable heat flow away from the molten pool and variable heat flow into the deposit caused by delays during direction changes of the motion system and overlapping effects of the laser spot during direction changes. Heat flow (represented by heat flux in calories per square centimeter per second) away from the molten pool varies with the geometry, or shape, of the underlying solid mass and the thermal gradient normal to the solid-liquid interface of the molten pool. Variable heat flow, which can be represented by a vector (having direction and magnitude), is compensated for by adjusting the energy per unit time delivered to the molten pool so that a constant heat balance is maintained. Laser power and deposition velocity are adjusted in proportion to the heat flux vector associated with the underlying deposition mass, temperature of the mass, and physical properties of the material being deposited (enthalpy and thermal conductivity). Variations of heat input to the deposit occur during delays, that is, during direction changes, because the motion drives have to decelerate and then accelerate to make a direction change. During a delay, laser input energy per unit time increases until full deposition speed is attained. Changes in direction produce overlapping areas of the laser spot in relation to the radius of curvature of the deposition path, again resulting in higher energy deposition per unit time. Heat input variations from delays can be altered by changing the tool path, so that direction changes take place outside the part boundaries, or adjusting (decreasing) the laser power during the delay. Heat input variations from laser spot overlapping (in going around a radius, the inside of the radius has more dwell time than the outside of the radius) can be altered by changing the tool path, such that direction changes take place outside the part boundaries, by changing from a "vectored" path (following the part contours) to a "rastered" path (motion is across part contours and the laser is turned on when deposition is required and off when it is not).

Consider formation of a solid rectangular plate 1 in. (25.4 mm) wide×0.08 in. (2.03 mm) thick and several inches high. The deposition zone is moved back and forth along the width of the plate. Assume that one trip across the width takes 2 seconds. Heat flux away from the deposition zone is calculated or measured for the conditions of (1) initial formation of a molten pool on the article support; (2) temperature of the support; (3) change in heat flow as the deposit grows away from the support; (4) temperature of the underlying solid deposit; (5) temperature of the center of the deposit; and (6) temperature of the edge of the deposit. Knowledge of these heat flux conditions is used to specify the quantity of laser energy required. For the first deposition layer, the laser energy and deposition speed needed to create a molten pool in the support and melt the powder introduced into the deposition zone are chosen. If the support is large with respect to the width or offers a large heat sink, the heat flow will be about the same at the ends as in the center of the plate because mass and area through which heat is conducted away are close to being the same for the first few deposition layers. As the deposition zone indexes up for the second pass, there is a delay as the motion apparatus decelerates to a stop and accelerates to full deposition speed in the reverse direction, crossing back over the area that was just heated when motion was opposite. The process continues with each end being heated twice during the direction reversal at the end, while the opposite end cools for almost 4 seconds during the traverse down and back. The center point of the plate sees the laser spot every 2 seconds. As the deposit is built away from the substrate, average temperature at the center is higher than at the ends and heat out-flow in the center is higher than at the ends because area and mass for heat conduction is greater at the center than at the ends. Adjustments are made to laser power and/or deposition zone velocity in proportion to heat flow away from the molten pool. Tool path adjustments can also be made to affect heat flow; e.g., turning the laser off at the end of each traverse and returning to the starting edge would allow the same cooling time (4 sec.) for all parts of the plate and remove the delay which occurs when the motion is reversed.

When more complex features, such as corners, are built, similar heat flow considerations as those described for the plate are encountered. For example, consider a right angle corner that is made by depositing along a path in a horizontal xy plane that is 0.5 in. (12.7 mm) in the x direction and then 0.5 in. (12.7 mm) in the y direction to create a 90 degree angle. Heat flow away from the molten pool will depend on the underlying mass and cross sectional area; laser power and deposition speed must be adjusted proportionally, as in the plate example. A delay in relative motion between laser beam and metal deposit occurs at a corner because the x axis motion has to decelerate to a stop prior to the y axis motion accelerating to deposition speed. This delay may be 0.1 sec. or less, but it is enough to influence deposition at the corner. If process parameters have been chosen such that energy flow into the molten pool during the delay is too high relative to energy flow during deposition at full speed, an undesired build-up is deposited at the corner during the delay. Two methods can be used to correct this situation. Powder flow can be decreased at the corner and then increased after motion is continued at normal speed in the new direction. Alternatively, the laser shutter can be closed at the instant the beam reaches the corner while the deposition head continues to move in the same direction off the deposit; this is followed by two right angle moves while off the part to align the motion with the y direction. The y motion then accelerates to full deposition speed prior to reaching the part and at the corner the laser shutter is opened and deposition begins again. If process parameters have been chosen such that mass flow rate into the molten pool is relatively low at the corner, relative to deposition at full speed, the delay at the corner causes more melting away of the underlying previously deposited layers and rounding downward of the corner. This situation can be corrected by decreasing laser power at the corner in proportion to the added heat build-up caused by the delay, by increasing powder flow into the molten pool at the corner, or by changing the tool path (as in the case above), so that the delay caused by the change of direction takes place outside the part boundaries. In deposition of a complex part with many corners of varying angle, ribs of varying dimension, holes, contours, etc., a similar procedure is followed. Heat flow analysis may be done and used as input to the postprocessor in order to establish changes in process parameters for a particular feature. Tool paths are determined according to the effects of delays and laser spot overlapping and changes to process parameters are made in compensation.

Joining of articles of two different metals with significantly different chemical compositions, mechanical properties, and/or physical properties to meet a required service condition is a long-standing problem. For example, joined metals which have greatly different coefficients of thermal expansion will often crack when heated or cooled. Metals which are simply melted together and allowed to mix in the liquid state often form brittle phases, leading to cracks once the joint is cooled and placed in service. Aluminum to stainless and copper to stainless joints are often required, but both combinations lead to brittle joints if the metals are simply melted and fused together. These problems can be solved by controlling the dilution of one metal in the other or by introducing a third interlayer material that is compatible with both of the materials to be joined, in order to keep the two base materials apart. The DLF process offers a method of quickly forming a joint between dissimilar metals by changing powder compositions as the joint region is fabricated. The amount of dilution is controlled by controlling the volume (approximately proportional to the depth of melt, assuming cross sectional area is constant) of re-melt into the previous layer when a layer of a second material is added. The amount of dilution would be expressed as the re-melt depth divided by the re-melt plus added layer depth of the second material. This fraction is varied by changing laser parameters, power, deposition speed, and powder mass flow to achieve the desired dilution by changing the re-melt and new-layer height while maintaining a good bond between layers. (If the re-melt depth is too thin, de-bonding at the layer interface will occur.) By knowing the amount of dilution, the resultant composition of the molten layer can be calculated for each element present in the two materials to be joined in subsequent layers. The diluted zone composition allows prediction of which metallurgical phases might form as a result of the dilution and prediction of mechanical properties. For example, a joint between mild steel and 304 stainless steel (Fe-18Cr-8Ni) may have a fully austenitic phase structure, an austenitic phase plus some delta ferrite, or a partially martensitic structure, depending on the composition of the diluted volume. These phase formations have been defined and diagrams which predict phase formation based on nickel and chromium composition of the base metals and dilution zone are in existence. What is desired in this example is an austenitic plus 4% ferrite structure in order to prevent cracking. One way of achieving the correct composition to control the microstructure is to put in a third metal as an interlayer between the mild steel and the 304 stainless steel, such as Hastelloy S (67Ni-15Cr-15Mo-2Co). Dilution with this material results in an easily controllable composition resulting in the desired microstructure. If a mild steel to 304 stainless steel joint is required, the DLF process could be used to first build up a section of mild steel, layer by layer. Then, powder supply composition would be switched to Hastelloy S. Three powder feeders with mild steel powder, Hastelloy S powder, and 304 stainless steel powder would be used by turning each on in succession, with the previously used feeder being turned off at the same time. Several layers of Hastelloy S would be applied and then the powder supply would be switched to 304 stainless steel. Laser power, deposition speed, and mass flow rate would be adjusted for the 304 stainless steel to provide a minimum dilution of the previous Hastelloy S layer of about 15%. A second variation to achieve the desired microstructure in the example above is adding the exact chemical elements needed in the dilution instead of using the pre-alloyed material (Hastelloy S). In this case, the dilution composition is calculated and the precise amounts of nickel and chromium are added with the first 304 stainless steel layer to achieve the desired metallurgical phase formation (austenite plus 4% ferrite). This is done by turning off the feeder for mild steel powder and turning on feeders for chromium, nickel, and 304 stainless steel powders. Rate of feed for the nickel and chromium feeders is then reduced as successive layers are built until the feed powder composition is that of 304 stainless steel. Using these methods, many other types of dissimilar joints can be fabricated. The key factors is controlling metallurgical phase formation by controlling dilution and the resultant composition between pure-component deposit layers.

A functionally graded material is a material which is formed by gradually altering composition from one location to another, thereby providing different metallurgical and mechanical properties from one location to another in the same article. For example, in a jet engine turbine disc, service conditions require an alloy with high stress rupture strength and low-cycle fatigue strength at the center of the disc and an alloy having high creep strength at the rim of the disc; there should be a gradation of properties over the radius of the disc, from center to rim. Lower temperatures at the center make creep strength less important, but higher temperatures at the rim make creep strength the limiting factor as to how hot the engine can run. By increasing the operating temperature that the rim can withstand, an increase in fuel efficiency of the engine can be realized. The DLF process makes it possible to grade the materials from center to rim to coincide with the temperature profile and required creep strength. Nickel base alloys are typically used for disc applications. A material such as Waspaloy (19.5Cr, 13.Co, 3.0Ti, 1.4Al, 4Mo, balance Ni) might be used for the center of the disc and the material of the disc is graded to the composition of IN100 (12.5Cr, 18.5Co, 4.3Ti, 5.0Al, 3.2Mo, balance Ni) at the rim of the disc (both are nickel base alloys). The higher creep strength (20% greater than Waspaloy) of IN100 is obtained where it is needed. Building the disc would begin at the center of the disc by fusing the Waspaloy powder in a radial direction a layer at a time. Once the deposit has progressed radially to the region where the creep strength limit of the Waspaloy is approached, a second powder feeder is turned on and IN100 powder is introduced into the deposit. Over several layers the amount of Waspaloy is ramped down, by decreasing the flow rate linearly with time, and the amount of IN100 is ramped up, by increasing the flow rate linearly with time. After Waspaloy is no longer flowing, the IN100 deposit is continued to the rim of the disc. The result is a disc of a functionally graded material to match the temperature and strength requirements established by the service conditions.

Following is a set of rules which were developed for the DLF process.

IF design specification for article exists, THEN assure CAM readable file format OR convert to CAM readable format, ELSE design article to functional specification optimizing for DLF fabrication.

IF enclosed empty volume defined in the part, THEN add design of drainage port OR re-specify orientation of growth.

IF materials and powder morphology are within previously established parameter sets, THEN set default conditions.

IF article has multiple features to be grown separately, THEN define a hierarchy of features and define a growth sequence to assure access to all features.

IF article is asymmetrical or has multiple features, THEN choose a growth orientation for each feature in accordance with the defined feature hierarchy.

IF multiple features are in a proximity which prohibits their growth separately, THEN combine them into a single logical feature to be grown concurrently.

IF article has multiple features of greatly varying size or mass, THEN define a growth sequence to optimize thermal flux and minimize thermal distortion effects.

IF article requires reorientation between feature growth, THEN minimize re-fixturing through redefining feature growth sequence.

IF seed features or physical datum of support structures are used, THEN define their orientation and extent within the manufacturing model to facilitate obstacle avoidance.

IF beginning a new deposit on an article support, THEN preheat substrate to required temperature by traversing the laser without powder deposition.

IF change of deposit density required, THEN choose new parameters (step over, step up, speed, etc.) to produce desired result (partially dense, honeycomb, fully dense).

IF required perimeter or edge heat flux conditions not met, THEN specify profile and/or laser deposition perimeter path parameters to optimize heat flux at the perimeter.

IF required heat flux conditions determined by calculation or measurement not met in body of feature, THEN change laser deposition area fill path type (spiral, raster, criss cross, etc.).

IF optimization of dimensional accuracy required (finishing mode), THEN choose appropriate parameters for the material being deposited.

IF optimization of deposition rate required (roughing mode), THEN choose appropriate parameters for the material being deposited.

IF encounter valley (location where no material is to be deposited), THEN beam shutter closed, power deflection gas on, traverse, open shutter, dwell (for preheating of article or article support), powder deflection gas off, proceed.

IF encounter obstacle, THEN beam shutter closed, power deflection gas on, retract, traverse, plunge, open shutter, dwell, powder deflection gas off, proceed.

IF encounter small radius or corner and heat flux requirements not met, THEN move at constant velocity, ramp laser power down and up in proportion to calculated or measured heat flux excursion, or apply corner conditions previously entered.

IF starting deposition in a new location or interruption of deposition has taken place, THEN dwell in proportion to article or article support temperature prior to introduction of powder.

IF wall deposition exceeds one laser deposition path width, THEN apply successive perimeter or profile pass parameters (i.e., step over/offset) as appropriate.

IF new growth initiation could be inhibited by build up of powder from previous operations, THEN insert commands to perform a gas jet cleaning pass (laser off) of the locations to be deposited upon.

IF the cross section of a feature changes during growth or global heat flux conditions change significantly, THEN adjust laser power.

IF tool path and/or limitations in system axis motions prevent deposition under default conditions for heat orientation, THEN change lead and angles for the deposition head.

IF obstacles prevent deposition under default conditions for heat orientation, THEN change lead and angle for the deposition head.

IF surface smoothness is to be optimized, THEN employ 5-axis surface following and laser glazing parameters.

IF surface smoothness is required AND 5-axis surface following is not possible, THEN employ layer by layer perimeter smoothing path conditions.

IF deposition conditions require on and off of laser energy, THEN employ the laser shutter before turning laser power on and off (to help maintain steady state thermal operating conditions of the laser system).

IF an error is detected (such as a collision or insufficient deposition head access) during simulation of tool path or post processing, THEN re-specification of tool path must be done.

MINIMIZE material usage and cost by:
  Use of empty space and internal support structures.
  Use of expensive materials only where required in an article.
  Use of functional grading of materials to achieve particular properties only in locations where they are needed.
  Avoidance of features which will collect powders during processing through design or growth orientation. Use of free form design for features which cannot be fabricated with conventional processing equipment and tools.

MINIMIZE time of growth by:
  Use of roughing passes.
  Finishing surfaces only as specified in article requirements.
  Use of additional processing (such as special corner conditions) only as needed.
  Appropriate choice of laser deposition path types (spiral, raster, etc.).

INCREASE strength of part by:
  Avoiding internal corners or features which can act as stress concentration points.
  Employing design strength features which are easily fabricated (such as ribs, gussets, bosses, and pads) and which minimize bulk deposition.
  Choosing materials which can be post heat-treated with the DLF laser beam.

The primary parameters, or control commands, of the DLF process, are rate of flow of powder into the deposition zone, energy density of the laser beam, and speed of movement of the deposition zone. As discussed, above, there are numerous additional parameters which must be established. Many of these parameters depend on the specific apparatus chosen for a DLF system and the characteristics of the article to be made. The information contained herein will allow one skilled in the art to choose appropriate parameters.

Figure 15:
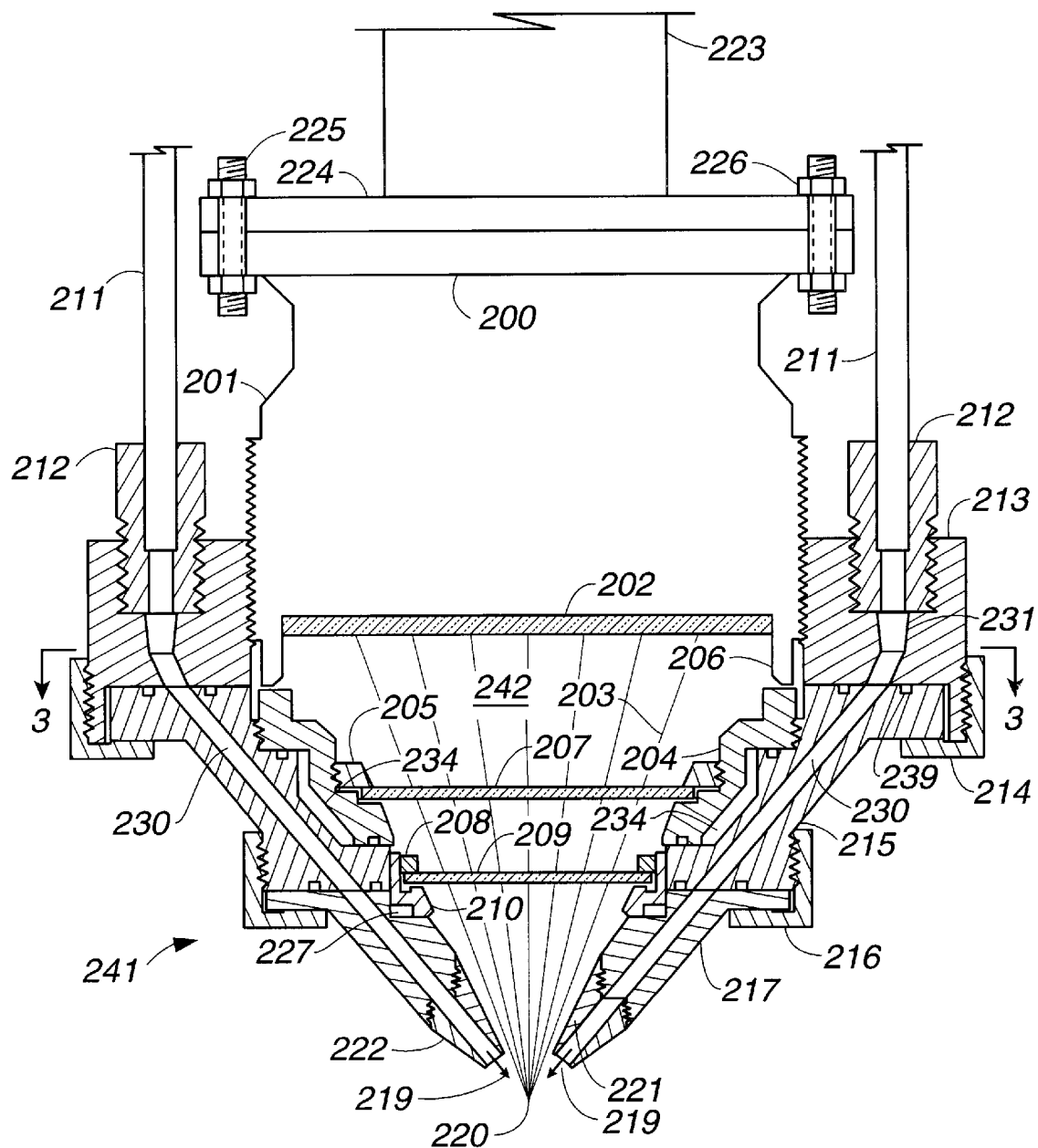
FIG. 15 depicts a delivery nozzle attached to an optics package in a vertical section view taken along the central axis of the nozzle.

FIG. 15 depicts the new deposition head. The head is comprised of optics package 201 and delivery nozzle 241. The optics package is commercially available apparatus for receiving and focusing laser light and is mated to the delivery nozzle. Laser beam 203 passes through protective window 202 and beam passage 242 and is focused at the point denoted by reference number 220. Protective window 202 is supplied as a part of optics package 201. Optics package 201 is fastened to flange 224 by means of bolts and nuts (such as shown by reference numbers 225 and 226) disposed around the circumferences of flange 224 and flange 200, which is a part of the optics package. Element 223 connects the deposition head to the motion apparatus. The laser light passes through element 223 and into and through the optics package.

Figure 18:
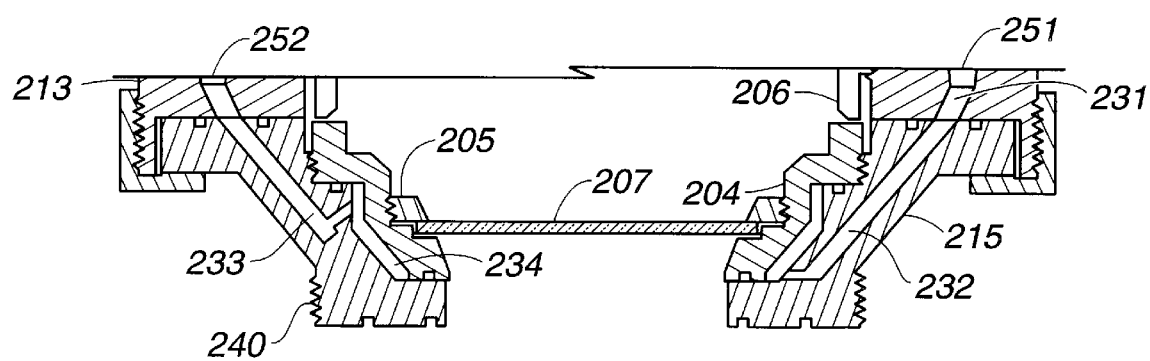
FIG. 18 is a vertical partial section view of a delivery nozzle taken as shown by section arrows of FIG. 16. It shows coolant passages.
Figure 19:
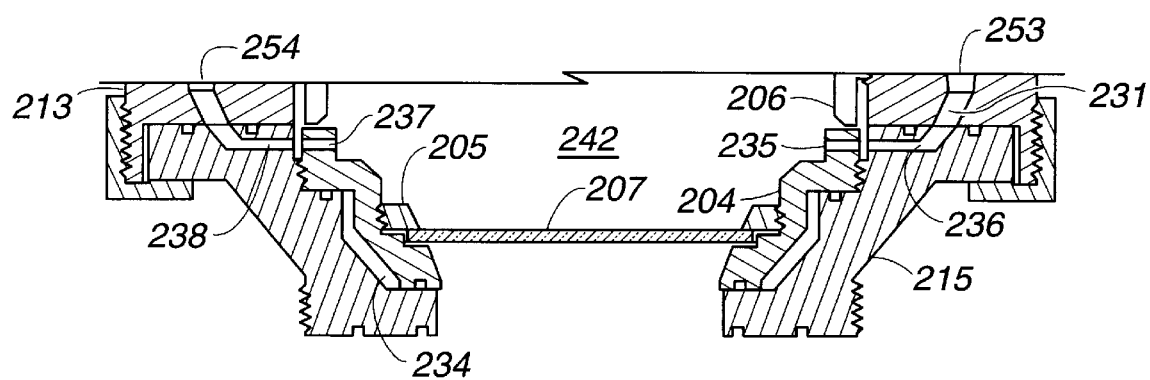
FIG. 19 is a vertical partial section view of a delivery nozzle taken as shown by section arrows of FIG. 16. It shows upper gas passages.
Figure 20:
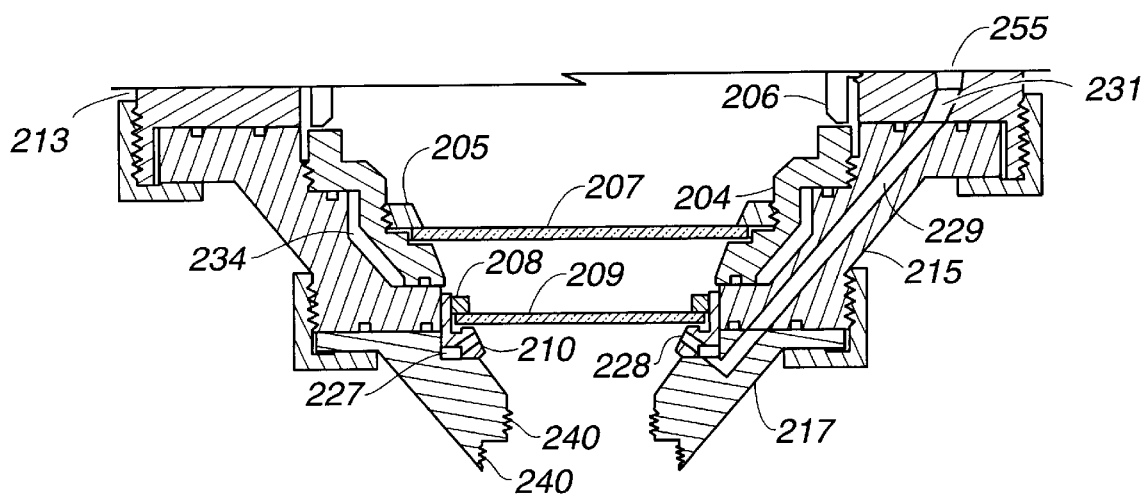
FIG. 20 is a vertical partial section view of a delivery nozzle taken as shown by section arrows of FIG. 16. It shows a lower gas passage.

Outer element 215 of the delivery nozzle is attached to bulkhead ring 213 by means of upper clamp ring 214, which is threaded to the bulkhead ring. Extension 217 is attached to outer element 215 by means of lower clamp ring 216, which is threaded to the lower portion of outer element 215. Inner nozzle tip 221 and outer nozzle tip 224 are attached to extension 217 by means of screw threads. Inner element 204 is attached to outer element 215 by means of screw threads. Coolant channel 224 is defined by an outer surface of the inner element and an inner surface of the outer element and extends circumferentially around the nozzle. Water or another coolant is circulated through channel 234 in order to cool the deposition head. Coolant inlet and outlet passages are shown in FIG. 18. Lower gas channel 227 is in the shape of a ring or portion of a ring and is provided with gas as shown in FIG. 20. Also shown in FIG. 20 are passages for flow of gas into the beam passage. FIG. 19 shows passages for flow of gas into the beam passage. Gas is flowed into the deposition head to purge the beam passage of powder and other material, thereby protecting the deposition head. Lower window 209 is disposed across beam passage 242. The window is of quartz and serves to protect the optics package from heat, particulate matter, molten metal, etc. Lower window 209 rests in lower window housing 210 and is held in place by lower window retainer 208. Lower window housing 210 is retained in extension 217 by means of screw threads (not shown) located at the surface indicated by reference no. 243 in FIG. 17. Lower window retainer 208 has threads on its external circumferential surface (not shown) which engage threads in lower window housing 210 at the surface indicated by reference no. 244 of FIG. 17. Upper window 207 may be provided for the purpose of protecting the optics package in the event that the lower window becomes damaged. The upper window rests in inner element 204 and is held in place by upper window retainer 205, which has threads on its outer circumference which engage threads on the inner element. The terms upper window and lower window are used because these terms describe their positions when the deposition head is oriented as shown in FIG. 2, even though the head may be tilted during operation.

Powder is supplied to the deposition head by means of conduits 211, which are connected to bulkhead ring 213 by means of tubing fittings 212. The powder is transported by means of a flowing gas stream. The powder and its carrier gas flow through powder passages 230 and exit the delivery nozzle at its lower end, as depicted by arrows 21. Each powder passage begins in bulkhead ring 213 and passes through outer element 21, extension 217, and the tip of the delivery nozzle, which is formed by inner nozzle tip 221 and outer nozzle tip 222. Reference no. 231 denotes a flow channel in bulkhead ring 213. The channel so denoted is a part of powder passage 230. There are other flow channels in the bulkhead ring for powder, coolant, and gas, as described below. Reference no. 239 denotes an exemplary O-ring channel for retaining an O-ring (not shown) for purposes of sealing. Other O-ring channels are shown, but not numbered. Those skilled in the art are capable of providing such sealing means and other features, such as gaskets at the outer surfaces of the windows. Reference no. 206 denotes a portion of the optics package which is called out only because it appears in FIGS. 17–20.

Figure 16:
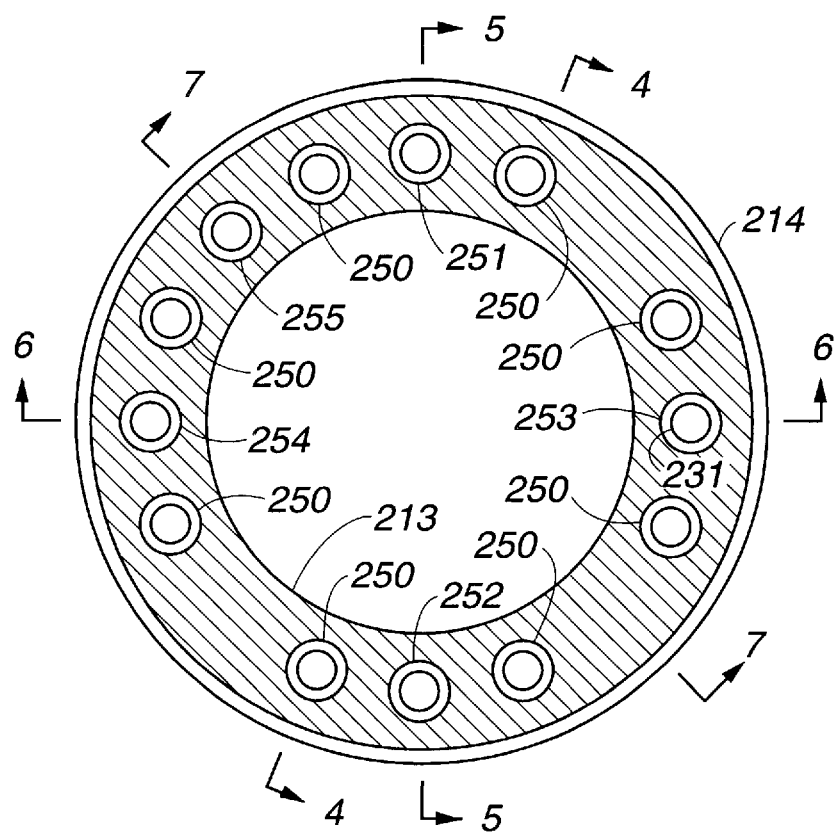
FIG. 16 is a section plan view taken as shown by the section arrows of FIG. 15. It shows powder passages.

FIGS. 17 through 20 depict that portion of the delivery nozzle below the section line for FIG. 3 which is shown in FIG. 15. The manner in which each section is taken is shown in FIG. 16, which is a plan view in section. Reference numbers are consistent with those of FIGS. 15 and 16 to permit correlations of elements from drawing to drawing.

FIG. 16 depicts inlet ports 250 through 255 in bulkhead ring C Clamp ring 214 is shown. Eight powder inlet ports denoted by reference no. 250 are shown. A powder conduit will be connected at each powder inlet port. A conduit carrying coolant will be connected to coolant inlet port 25. Coolant will leave the deposition head by means of a conduit connected to coolant outlet port 252. Gas is provided to the deposition head by means of conduits which will be connected to gas inlet ports 253 and 25. Gas is removed by means of gas outlet port 254. Flow channels pass through bulkhead ring 213, starting at each of the ports, as represented by reference no. 23.

Figure 17:
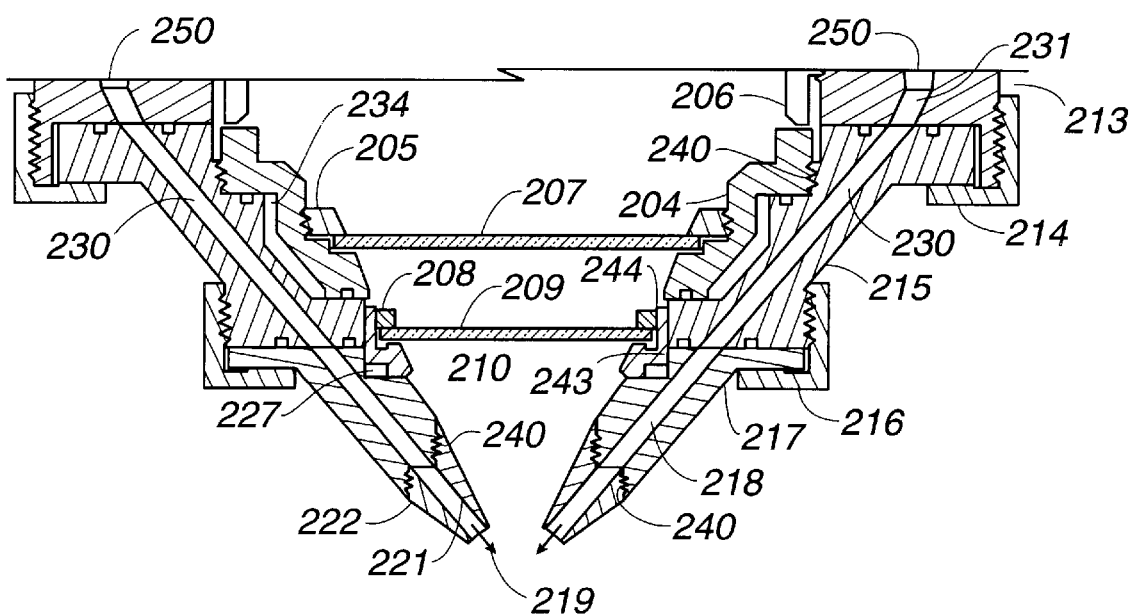
FIG. 17 is a vertical partial section view of a delivery nozzle taken as shown by section arrows of FIG. 16. It shows powder passages.

FIG. 17 shows powder passages 23, each of which extends from a powder inlet port 250 toward a deposition zone which surrounds laser beam focal point 220, as shown in FIG. 2. Inner nozzle tip 221 and outer nozzle tip 222 each have a hollow frustoconical configuration and are disposed such that a frustoconical annular space is formed between the outer surface of inner tip 221 and the inner surface of outer tip 222. The central axes of the laser beam passage, the inner tip, and the outer tip are coincident. The powder passages extend through the annular space, but are not defined within the annular space, that is, powder from the eight separate powder passages through extension 217 may mix in the annular space. The powder passages are disposed around the circumference of the nozzle and are provided in pairs, with one of each pair about 180 degrees from the other. It is not necessary that the passages be equally spaced, but it is highly desirable that they be provided in pairs to avoid biasing the growth of an article. At least two powder streams should be provided. Reference no. 240 depicts certain locations having screw threads. In some applications, it may be desirable to provide ribs on either the inner nozzle tip or outer nozzle tip to separate the powder passages from one another. This embodiment will permit variations in powder type and flow. For example, if 8 powder streams are needed, 3 streams could provide one metal to the depiction zone while 5 streams provide another metal, thereby forming an alloy. Powder carrier gas pressure might be varied, with one or more streams having a higher pressure when the head is tilted in order to compensate for the gravitational effects of the differing orientation of the powder paths. A one-piece nozzle tip may be used instead of the two piece nozzle tip which is shown in FIG. 17; it could be attached by means of the threads used to attach inner nozzle tip 201. A one-piece nozzle tip might contain 2, 4, or more tubular powder passages. The powder pattern may be varied by providing a nozzle tip having powder passages which are not uniformly oriented in a conical manner, as depicted in FIG. 4. Powder passage angles may be varied.

FIG. 18 depicts coolant inlet passage 232, which provides coolant from a conduit attached to bulkhead ring 213 at coolant inlet port 251 to coolant channel 234. Coolant outlet passage 233 carries coolant away from the coolant channel to coolant outlet port 252.

FIG. 19 depicts upper gas channels. Gas flows into bulkhead ring 213 at gas inlet port 253 and passes through one of the flow channels 231, which is aligned with upper gas inlet channel 236 in outer element 215. Gas flows from upper gas inlet channel 236 through upper gas flow channel 235, which is a part of inner element 204, into beam passage 242. Gas flows out of the beam passage through upper gas flow channel 237 and upper gas outlet channel 238, exiting the nozzle at upper gas outlet port 2. The flow of gas through the space between protective window 202 and upper window 207, or the space between the protective window and lower window 209 if the upper window is not used, serves to protect the optics package.

FIG. 20 depicts lower gas passage 229, which extends from lower gas inlet port 255 through bulkhead ring 213 and outer element 215 into extension 217. Gas flows from gas passage 229 into lower gas channel 227, which distributes the gas to flow passages in lower window housing 210. Lower gas channel 227 extends entirely around or substantially around the nozzle in a circumferential manner in order to communicate with the gas flow passages. Reference no. 228 denotes one such passage. There are 5 additional passages (not shown) spaced around lower window housing 210, all of which connect with lower gas channel 227. The gas flow passages in the lower window housing are oriented such that gas flowing out of them impinges on the surface of the lower window which is proximate to the lower end of the nozzle. The purpose of the gas flow is to remove powder and other material from the lower window and aid in protection of the deposition head from heat, molten metal splatters, etc.

The delivery nozzle may be fabricated of any material suitable to withstand the heat produced by the laser beam. Stainless steel is one choice. The inner nozzle tip and outer nozzle tip, which are those parts of the nozzle closest to the molten metal of the deposition zone, may be fabricated of a metal or a machinable ceramic which has a high service temperature rating. One such ceramic is Macor (tradename), which is available from Corning Glass and is comprised of silicon dioxide, alumina, magnesium oxide, potassium oxide and several lesser compounds.

The powder, gas, and water passages of a prototype delivery nozzle have their central axes at an angle of about 40 degrees to the central axis of the beam passage, so that the total angle between powder streams leaving the annular space at the tip of the nozzle is about 80 degrees. Values of from about 20 to about 75 degrees may be used. The outer radius of the bulkhead ring of the prototype nozzle is about 2.45 in. (62.2 mm) and its thickness is about 1.2 in. (30.5 mm). The vertical height of the outer element is about 1.2 in. (30.9 mm) and that of extension 17 is about 0.7 in. (17.6 mm). The outer radius of the upper end of the inner element is about 1.58 in. (40.1 mm) and that of the lower end is 0.81 in. (20.5 mm). The inside radius of the inner nozzle tip at its upper end is about 0.42 in. (10.7 mm) and that of its lower end is 0.18 in. (4.6 mm). The outer surface of the inner nozzle tip is at an angle of about 50 degrees to the central axis of the nozzle, in comparison to the 40 degrees used in the upper portion of the nozzle. The inner surface of the outer nozzle tip is at an angle of 40 degrees to the axial centerline of the nozzle. The inner radius of the upper end of the outer nozzle tip is about 0.56 in. (14.3 mm) and that of the lower end is about 0.24 in. (6.1 mm).

What is claimed is:

1. A method of forming an article from materials in particulate form, said method comprising:
   a. defining shape and dimensions of an article and creating a tool path and control commands effective to form said article by deposition of molten material;
   b. focusing a laser beam at a location within a deposition zone;
   c. providing powder to said deposition zone along a plurality of paths which are disposed about the laser beam and converge within the deposition zone;
   d. forming a pool of molten material in the deposition zone by melting a portion of an article support and said powder by means of energy provided by said laser beam;
   e. depositing molten material from the deposition zone on said article support at points along a first portion of said tool path by moving the deposition zone along the tool path, where said molten material solidifies after leaving the deposition zone, in order to form a portion of said article which is adjacent to the article support;
   f. forming a pool of molten material in the deposition zone by melting a portion of said partially formed article and said powder by means of energy provided by the laser beam;
   g. depositing molten material from the deposition zone at points along a second portion of the tool path by moving the deposition zone along the tool path, where the molten material solidifies after leaving the deposition zone, in order to complete formation of the article; and
   h. controlling flow of powder into the deposition zone, energy density of the laser beam, and speed of movement of the deposition zone along the tool path by means of said control commands as deposition takes place.

2. The method of claim 1 where the deposition zone is moved along the tool path by apparatus under control of a digital computer containing a program describing the tool path.

3. The method of claim 1 where said control commands are executed by apparatus under control of a digital computer containing a program specifying locations on the tool path at which the control commands are to be executed.

4. The method of claim 1 where shape and dimensions of an article are defined by use of and within a digital computer.

5. The method of claim 1 where said flow of powder into the deposition zone, energy density of the laser beam and speed of movement of the deposition zone along the tool path are controlled by a computer program for forming an article created in a digital computer by:
   a. creating a design file containing shape and dimensions of the article;
   b. creating a tool path effective to form the article defined by said design file; and
   c. establishing control commands effective to form the article and embedding the control commands in the tool path.

6. The method of claim 5 where the design file is created by use of a computer-aided design program.

7. The method of claim 5 where said tool path with embedded control commands is created by use of an adapted computer-aided manufacturing program.

8. The method of claim 1 further characterized in that:
   a. shape and dimensions of the article are defined in a digital design file created by use of a computer-aided design program;
   b. a digital cutter location file is created using said design file and an adapted computer-aided manufacturing program;
   c. a digital post-processor specific to laser deposition apparatus is created;
   d. a digital machine operating file is created by operating upon said cutter location file with said post-processor; and
   e. apparatus for moving the deposition zone along the tool path and executing the control commands is controlled by means of a digital computer directed by said machine file.

9. The method of claim 1 where computer numerical control apparatus is used to move the deposition zone along the tool path.

10. The method of claim 1 where powder composition is varied during formation of an article.

11. The method of claim 1 where at least two powder paths are utilized, the powder paths are arranged in pairs, and a first path of a pair is oriented about 180 degrees from a second path of the pair.

12. The method of claim 1 where an article of variable density is formed.

13. Apparatus for forming an article from materials in particulate form comprising:
   a. means for defining shape and dimensions of an article and creating a tool path and control commands which are effective to form said article by deposition of molten material;
   b. means for storing said tool path and control commands;
   c. means for providing a laser beam and focusing said laser beam at a location within a deposition zone, where said laser beam is capable of providing sufficient energy to substantially melt material in said deposition zone;
   d. a delivery nozzle comprised of a laser beam passage through which the laser beam passes and a plurality of passages for flow of powder carried by a gas stream, where said powder passages are disposed around said beam passage and their extended axial center-lines converge in the deposition zone;
   e. means for providing powder to said delivery nozzle;
   f. means for moving the deposition zone along said tool path;
   g. means for controlling movement of the deposition zone in accordance with said stored tool path; and
   h. means for controlling rate of flow of powder into the deposition zone, energy density of the laser beam, and speed of movement of the deposition zone along the tool path in accordance with said stored control commands.

14. The apparatus of claim 13 where said delivery nozzle is comprised of a first frusto-conical shape and a second frusto-conical shape disposed on a common central axis to form an annular space between the exterior surface of said first shape and the exterior surface of said second shape, where said annular space comprises said powder passages, and where the powder is discharged from the delivery nozzle into the deposition zone through a powder delivery port at the small diameter ends of said shapes.

15. The apparatus of claim 13 further including means for controlling the atmosphere in which deposition of molten material takes place.

16. The apparatus of claim 13 where the central axis of each powder passage and the central axis of the laser beam form an angle of from about 10 to about 75 degrees.

17. The apparatus of claim 13 further including means for rotating the delivery nozzle such that the deposition zone describes an arc in a vertical plane.

18. The apparatus of claim 13 where at least two powder passages are utilized, the powder passages are arranged in pairs, and a first passage of a pair is oriented about 180 degrees from a second passage of the pair.

19. The apparatus of claim 13 where said means for defining shape and dimensions of an article is a computer-aided design program.

20. The apparatus of claim 13 where the tool path and control commands are created by use of a digital computer.

21. The apparatus of claim 13 where said means for storing the tool path and control commands is a digital computer.

22. The apparatus of claim 13 where movement of the deposition zone is accomplished by apparatus under control of a digital computer containing a machine operating file.

23. The apparatus of claim 13 where said means for moving the deposition zone along the tool path is comprised of computer numerical control apparatus.

24. The apparatus of claim 13 further including a computer-aided design program for use in creation of a digital design file containing shape and dimensions of an article.

25. The apparatus of claim 13 further including a digital computer containing a machine operating file which controls said means for moving the deposition zone along the tool path.

26. The apparatus of claim 13 further including a digital computer containing a computer-aided manufacturing program for creating the tool path and embedding control commands in it.

27. The apparatus of claim 13 where said means for creating a tool path and control commands is comprised of an adapted computer-aided manufacturing program.

28. The apparatus of claim 13 where said means for providing and focusing the laser beam is controlled by a digital computer.

29. The apparatus of claim 13 further including a digital computer containing:
   a. a computer-aided design program for creating a digital design file;
   b. an adapted computer-aided manufacturing program; and
   c. a post-processor.

30. The apparatus of claim 13 further including means for varying powder composition.

* * * * *